(12) United States Patent
Dutta et al.

(10) Patent No.: US 11,562,510 B2
(45) Date of Patent: Jan. 24, 2023

(54) REAL-TIME CONTEXT BASED EMOTICON GENERATION SYSTEM AND METHOD THEREOF

(71) Applicant: SAMSUNG ELECTRONICS CO., LTD., Suwon-si (KR)

(72) Inventors: Sattdeepan Dutta, Noida (IN); Rohit Thapliyal, Noida (IN); Ravi Singh, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 238 days.

(21) Appl. No.: 17/102,650

(22) Filed: Nov. 24, 2020

(65) Prior Publication Data

US 2021/0192800 A1 Jun. 24, 2021

(30) Foreign Application Priority Data

Dec. 21, 2019 (IN) .............................. 201911053301

(51) Int. Cl.
| | |
|---|---|
| *G06T 11/00* | (2006.01) |
| *G06F 40/205* | (2020.01) |
| *G06F 40/30* | (2020.01) |
| *G06F 40/284* | (2020.01) |
| *G06N 3/04* | (2006.01) |
| *G06N 3/08* | (2006.01) |

(52) U.S. Cl.
CPC ............ *G06T 11/00* (2013.01); *G06F 40/205* (2020.01); *G06F 40/284* (2020.01); *G06F 40/30* (2020.01); *G06N 3/04* (2013.01); *G06N 3/08* (2013.01); *G06T 2210/44* (2013.01)

(58) Field of Classification Search
CPC ...... G06T 11/00; G06F 40/284; G06F 40/205; G06F 40/30; G06N 3/04; G06N 3/00
See application file for complete search history.

(56) References Cited

U.S. PATENT DOCUMENTS

| | | | |
|---|---|---|---|
| 2005/0156873 A1 | 7/2005 | Walter et al. | |
| 2019/0122403 A1 | 4/2019 | Woo et al. | |
| 2019/0122412 A1 | 4/2019 | Woo et al. | |
| 2019/0126152 A1 | 5/2019 | Taylor et al. | |
| 2021/0192800 A1* | 6/2021 | Dutta | ..................... G06T 11/00 |

FOREIGN PATENT DOCUMENTS

| | | |
|---|---|---|
| KR | 10-2018-0080986 A | 7/2018 |
| WO | 2018/128214 A1 | 7/2018 |
| WO | 2019/142127 A1 | 7/2019 |

OTHER PUBLICATIONS

Communication dated Aug. 5, 2022 by the Indian Patent Office for Indian Patent Application No. 201911053301.

* cited by examiner

*Primary Examiner* — Todd Buttram
(74) *Attorney, Agent, or Firm* — Sughrue Mion, PLLC

(57) ABSTRACT

A method for generating a real-time context-based emoticon may include receiving conversation information associated with a conversation between a set of users. The method may include identifying an attribute associated with the conversation. The method may include generating a base emoticon. The method may include generating an output shape based on a fiducial point of the base emoticon. The method may include transforming the output shape of the base emoticon with an accessory. The method may include generating the real-time context-based emoticon for the conversation, based on transforming the output shape of the base emoticon with the accessory.

20 Claims, 30 Drawing Sheets

REAL-TIME CONTEXT BASED EMOTICON GENERATION SYSTEM AND METHOD THEREOF

CROSS-REFERENCE TO RELATED APPLICATION(S)

This application is based on and claims priority under 35 U.S.C. § 119 to Indian Patent Application 201911053301, filed on Dec. 21, 2019 in the Indian Patent Office, the disclosure of which is incorporated by reference herein in its entirety.

BACKGROUND

1. Field

The present disclosure relates generally to generation of emoticons, and particularly, but not exclusively, to systems and methods for generating context based emoticons in real-time.

2. Description of Related Art

In today's scenario, users are interacting with each other by using their respective computing devices, virtually. The users are also accessing or sharing the content with each other in a virtual environment, for example, creating a post and publishing on social media websites, sending comments on the content, sending personal messages, etc. For these purposes, the users are generally using emoticons rather than text information. The use of emoticons provides facial expressions of the users to convey the sentiment and/or intended tone. Typically, emoticons are generally established as a ubiquitous language that bridges users who speak different languages and who are from different countries, cultures, and demographic groups, as sentiment is main intention of using the emoticons. The use of the emoticons has grown rapidly over many diversified areas, such as chats, marketing, social media posts, advertisements, and the like.

However, a limited number of emoticons are present in a computing device keyboard. Further, only a tiny fraction of emoticons is used in a very large frequency, therefore most of the emoticons go unused. The users have to adjust to express the sentiment/tone using a fixed set of emoticons for all situations. No personalization of emoticons is present in the computing devices, i.e. the same emoticons are being used for all types of conversations, for example, formal, informal, intimate, etc., which makes a user hesitant to use an emoticon in certain conversations. Additionally, the keyboard also does not understand the context of currently typed text associated with the conversation, does not consider the text from previous messages, and hence does not create or suggest relevant emoticons to the user(s). In the existing devices, custom and animated versions of popular emoticons characters are present. The feature uses face identification by utilizing a facial recognition system to create a three-dimensional emoticon that mirror the user's facial expression. In this way, the user is forced to choose from existing emoticons. Further, the existing devices create an animated version of the user, and add a personal touch to a message, associated with the conversation, with an emoticon that follows the user's movements and expressions. In this way, generated emoticons only consider facial expressions without understanding the context of the conversation. Additionally, by using the existing devices, the user can search an emoticon directly by typing any word and relevant emoticons are suggested to the user. In this way, a suggestion is based on the emoji already present in the keyboard's library. Further, no contextually relevant runtime creation of emoticon is available in the existing devices. In the existing devices, the emoticon generation based on a user profile is not available. Furthermore, it is difficult to express complex emotions such as satire, sarcasm, level of emotion intensity, etc., and also attributes such as color, shape, external objects, accessories cannot be customized in the existing devices.

US20170140214A1 discloses a feature of acquiring real-time image data depicting at least a portion of a face of a user of a computing system (or device). The real-time image data can be analyzed to determine a state associated with at least the portion of the face. An emoticon can be provided based on the state associated with at least the portion of the face. The emoticon can be inputted in a communication to be made by the user. In US20170140214A1, a base emoticon is selected based on the face of the user. The emoticon transformation is done by style transfer of the user's facial features on to the emoticon.

WO2019142127A1 discloses features of creating multiple expression emoticons relating to a user and multiple emojis for different emotions, by receiving a selection of an image from a user including at least a face or anterior part of a human head, performing an image processing operation for extracting the human head portion and removing background information, analyzing the first portion to determine parameters including age, ethnicity and skin color, identifying overlays, identifying key asset/feature Region of interest (ROIs) and filling pixel portions corresponding to ROIs, creating second portions corresponding to each overlay exhibiting a unique expression, and rescaling the second portions to match a pre-determined resolution.

US20190122412A1 discloses animated emoji mashup generation for contextual information received by a user at an application. The animated emoji mashup may come in the form of emojis coherently combined with one or more images to represent the contextual idea or emotion being conveyed. Emojis are context aware and consider emotions/sentiments of the user.

KR20180080986A discloses machine learning-based emoji suggestion considering context and sentiment of the user. It considers only a single emotion, and no representation of mixed emotions in single emoji is considered.

Therefore, there is a need of a real-time emoticon generation system and method that addresses the aforementioned drawbacks and provides real-time generation and transformation of personalized emoticons.

SUMMARY

This summary is provided to introduce concepts related to generation of a real-time context based emoticon. This summary is neither intended to identify essential features of the present disclosure nor is it intended for use in determining or limiting the scope of the present disclosure.

For example, various embodiments herein may include one or more systems and methods for generating a real-time context based emoticon are provided.

In accordance with an aspect of the disclosure, a method for generating a real-time context-based emoticon may include receiving conversation information associated with a conversation between a set of users. The method may include identifying an attribute associated with the conversation. The method may include generating a base emoticon. The method may include generating an output shape based on a fiducial point of the base emoticon. The method may include transforming the output shape of the base emoticon with an accessory. The method may include generating the real-time context-based emoticon for the conversation, based on transforming the output shape of the base emoticon with the accessory.

In accordance with another aspect of the disclosure, a real-time context-based emoticon generation system may include a memory configured to store instructions; and a processor configured to execute the instructions to: receive conversation information associated with a conversation between a set of users; identify an attribute associated with the conversation, based on the conversation information; generate a base emoticon; generate an output shape of the base emoticon based on a fiducial point of the base emoticon; transform the output shape of the base emoticon with an accessory, based on the attribute associated with the conversation; and generate the real-time context-based emoticon for the conversation, based on transforming the output shape of the base emoticon with the accessory.

In accordance with another aspect of the disclosure, a method for generating a real-time context-based emoticon may include receiving conversation information associated with a conversation between a set of users; extracting an attribute from the conversation, based on the conversation information; identifying a subject, an action being performed during the conversation, and an accessory associated with the attribute associated with the conversation; predicting the intensity of the attribute based on user behavior and a context associated with the conversation; identifying a relevant keyword associated with the context from the conversation; selecting an emoticon from a plurality of pre-determined emoticons which is correlated with the attribute for the keyword; identifying an image content based on the attribute associated with the conversation; converting the image content to a base emoticon using a machine learning translation model during runtime; generating an output shape based on one or more fiducial points of the base emoticon; determining one or more facial features represented by the output shape of the base emoticon; generating a set of motion vectors based on the one or more facial features, the identified attribute associated with the conversation and the generated output shape; normalizing at least one motion vector and the generated output shape of the base emoticon; transforming the normalized motion vector and the generated output shape of the base emoticon; and generating the real-time context-based emoticon for the conversation.

In accordance with another aspect of the disclosure, a real-time context-based emoji generation system may include a memory configured to store instructions; and a processor configured to execute the instructions to: receive conversation information associated with a conversation between a set of users; extract an attribute from the conversation; predict the intensity of the attribute based on user behavior and a context associated with the conversation; identify a relevant keyword associated with the context from the conversation; select an emoticon from a plurality of pre-determined emoticons which is correlated with the attribute; generate a base emoticon using the selected emoticon; generate an output shape based on one or more fiducial points of the base emoticon; determine an emotion represented by the output shape of the base emoticon; generate a set of motion vectors based on the determined emoticon, wherein the attribute is associated with the conversation, and the generated output shape; normalize at least one motion vector from the set of motion vectors and the generated output shape of the base emoticon; transform the normalized motion vector and the generated output shape of the base emoticon; and generate a transformed emoticon for said conversation.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and modules.

The above and other aspects, features, and advantages of certain embodiments of the present disclosure will be more apparent from the following description taken in conjunction with the accompanying drawings, in which.

Figure 1:
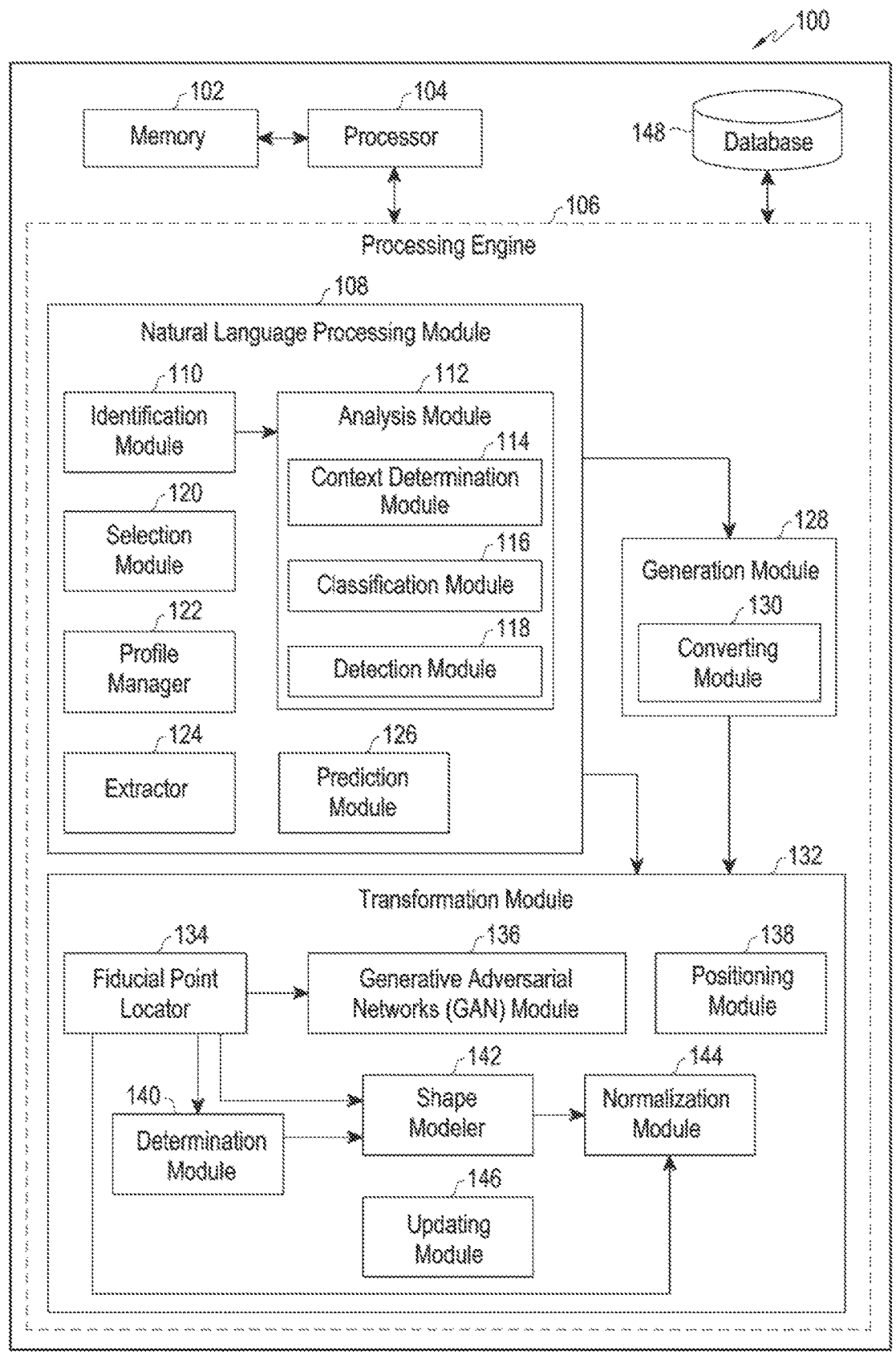
FIG. 1 illustrates a block diagram depicting a real-time context based emoticon generation system, according to an embodiment.

It should be appreciated by those skilled in the art that any block diagrams herein represent conceptual views of illustrative systems embodying the principles of the present disclosure. Similarly, it will be appreciated that any flowcharts, flow diagrams, and the like, represent various processes which may be substantially represented in a computer readable medium in the form of instructions and may be executed by a computer or processor, whether or not such computer or processor is explicitly shown.

DETAILED DESCRIPTION

In the following description, for the purpose of explanation, specific details are set forth in order to provide an understanding of the present disclosure. It will be apparent, however, to one skilled in the art that the present disclosure may be practiced without these details. One skilled in the art will recognize that embodiments of the present disclosure, some of which are described below, may be incorporated into a number of systems.

The various embodiments of the present disclosure provide a real-time context based emoticon generation system and method thereof.

Furthermore, connections between components and/or modules within the figures are not intended to be limited to direct connections. Rather, these components and modules may be modified, re-formatted or otherwise changed by intermediary components and modules.

References in the present disclosure to "one embodiment" or "an embodiment" mean that a particular feature, structure, characteristic, or function described in connection with the embodiment is included in at least one embodiment of the disclosure. The appearances of the phrase "in one embodiment" in various places in the specification are not necessarily all referring to the same embodiment.

In one of the embodiments, a method for generating a real-time context based emoticon includes a feature of receiving, by a natural language processing (NLP) module, on-going conversation between at least two or more users, and analysing the conversation. The method includes a step of identifying, by an identification module, at least one attribute associated with the conversation. The method includes a step of analysing, by an analysis module, the identified attribute associated with the conversation. The method includes a step of generating, by a generation module, a base emoticon using at least one of one or more user inputs and at least one pre-determined emoticon. The method includes a step of generating, by a fiducial point locator, an output shape by determining one or more fiducial points of the base emoticon. The method includes a step of transforming, by a GAN (generative adversarial networks) module, the output shape of the base emoticon with an accessory, and creating a transformed emoticon for the conversation.

In another implementation, the on-going conversation is in the form of text, audio, and video conversation.

In another implementation, the method includes a step of identifying and parsing, by the identification module, the at least one attribute associated with the conversation.

In another implementation, the identified attribute includes at least one context, emotion, and action associated with the conversation.

In another implementation, the method includes a step of determining, by a context determination module, context associated with the conversation.

In another implementation, the method includes a step of classifying, by a classification module, the identified emotion associated with the conversation into at least one emotional state.

In another implementation, the method includes a step of detecting, by a detection module, at least one action associated with the conversation.

In another implementation, the method includes a step of identifying, by a positioning module, a position of the selected accessory in the base emoticon and creating the transformed emoticon for the conversation.

In another implementation, the method includes a step of selecting, by a selection module, at least one pre-determined emoticon and at least one accessory based on the analysed attribute.

In another implementation, the output shape of the base emoticon is transformed and positioned with the selected accessory to generate the transformed emoticon.

In another implementation, the step of identifying the position includes a step of computing, by the positioning module, weightage of the base emoticon and the attributes using a machine learning technique.

In another implementation, the method includes a step of storing, in a database, a plurality of pre-determined emoticons and a plurality of accessories based on one or more attributes.

In another implementation, the method includes a step of transforming, by a transformation module, one or more convoluted features of at least one pre-determined emoticon stored in the database by morphing a pre-learnt transformation of a geometric shape of the transformed features based on the attributes.

In another implementation, the method includes a step of managing, by a profile manager, profiles of each of the users associated with the conversation by determining a conversation style and relationship between the users. The method includes a step of extracting, by an extractor, information related to a subject, an action being performed during the conversation, and one or more accessories related to the attribute. In another implementation, the method includes a step of predicting, by a prediction module, the intensity of the attribute by using user behavior and the profiles and a context associated with the conversation. In another implementation, the method includes a step of identifying, by the selection module, at least one relevant keyword associated with the context from the conversation, and checking a set of the pre-determined emoticons for the identified keyword from the database.

In another implementation, the inputs include the subject, the action, the accessories, the user profiles, words, and objects.

In another implementation, the method includes a step of identifying, by a converting module, an image content of the selected pre-determined emoticon representing the emotion or the accessory based on the attribute associated with the conversation, and converting the image content to the base emoticon using a machine learning translation model.

In another implementation, the method includes a step of determining, by a determination module, an emotion represented by the output shape of the base emoticon. The method includes a step of generating, by a shape modeler, a set of motion vectors by using the determined emotion, the attribute associated with the conversation, and the generated output shape. The method includes a step of normalizing, by a normalization module, at least one motion vector from the set of vectors and the generated output shape of the base emoticon. The method includes a step of transforming, by the GAN (generative adversarial networks) module, the normalized motion vector and the generated output shape of the base emoticon, and creating the transformed emoticon for the conversation.

In another implementation, the output shape of the base emoticon is generated using a neural network.

In another implementation, the step of creating, by the GAN module, the transformed emoticon for the conversation in real-time.

In another implementation, the method includes a step of updating, by an updating module, one or more features of the base emoticon and personalization based on the determined relationship between the users using a reinforcement model. The method includes a step of generating, by the updating module, a class of one or more emoticons to represent the determined relationship.

In another embodiment, a real-time context based emoticon generation system includes a memory, a processor, and a processing engine. The memory is configured to store pre-defined rules. The processor is configured to generate system processing commands based on the pre-defined rules. The processing engines include a natural language processing (NLP) module, a generation module, and a transformation module. The NLP module is configured to receive on-going conversation between at least two or more users, and is further configured to analyse the conversation. The NLP module includes an identification module and an analysis module. The identification module is configured to identify at least one attribute associated with the conversation. The analysis module is configured to analyse the identified attribute associated with the conversation. The generation module is configured to generate a base emoticon using at least one of one or more inputs and a pre-determined emoticon. The transformation module includes a fiducial point locator and a GAN (generative adversarial networks) module. The fiducial point locator is configured to determine one or more fiducial points of the base emoticon and generate an output shape of the base emoticon. The GAN module is configured to transform the output shape of the base emoticon with an accessory, and create a transformed emoticon for the conversation.

In another implementation, the identification module is configured to identify and parse the at least one attribute associated with the conversation.

In another implementation, the identified attribute includes at least one context, emotion, and action associated with the conversation.

In another implementation, the analysis module includes a context determination module. The context determination module is configured to determine context associated with the conversation.

In another implementation, the analysis module includes a classification module. The classification module is configured to classify the identified emotion associated with the conversation into at least one emotional state.

In another implementation, the analysis module includes a detection module. The detection module is configured to detect at least one action associated with the conversation.

In another implementation, the NLP module includes a selection module. The selection module is configured to select at least one pre-determined emoticon and at least one accessory based on the analysed attribute.

In another implementation, the transformation module includes a positioning module. The positioning module is configured to identify a position of the selected accessory in the base emoticon and create the transformed emoticon for the conversation.

In another implementation, the positioning module is configured to compute weightage of the base emoticon and the attributes using a machine learning technique and identify the position of the selected accessory.

In another implementation, the system includes a database. The database is configured to store a plurality of pre-determined emoticons and a plurality of accessories based on attributes.

In another implementation, the transformation module is configured to transform one or more convoluted features of at least one pre-determined emoticon stored in the database by morphing a pre-learnt transformation of a geometric shape of the transformed features based on the attributes.

In another implementation, the NLP module includes a profile manager, an extractor, and a prediction module. The profile manager is configured to manage profiles of each of the users associated with the conversation by determining a conversation style and relationship between the users. The extractor is configured to extract information related to subject, an action being performed during the conversation, and one or more accessories related to the attribute. The prediction module is configured to predict the intensity of the attribute by using user behavior and the profiles and a context associated with the conversation. The selection module is configured to identify at least one relevant keyword associated with the context from the conversation, and check a set of the pre-determined emoticons for the identified keyword from the database.

In another implementation, the generation module includes a converting module. The converting module is configured to identify an image content of the selected pre-determined emoticon based on the attribute associated with the conversation, and convert the image content to the base emoticon using a machine learning translation model.

In another implementation, the transformation module includes a determination module, a shape modeler, and a normalization module. The determination module is configured to determine an emotion represented by the output shape of the base emoticon. The shape modeler is configured to generate a set of motion vectors by using the determined emotion, the attribute associated with the conversation, and the generated output shape. The normalization module is configured to normalize at least one motion vector from the set of vectors and the generated output shape of the base emoticon. The GAN (generative adversarial networks) module is configured to transform the normalized motion vector and the generated output shape of the base emoticon, and create the transformed emoticon for the conversation.

In another implementation, the fiducial point locator is configured to generate the output shape of the base emoticon using a neural network.

In another implementation, the transformation module is configured to create the transformed emoticon for said conversation in real-time.

In another implementation, the transformation module includes an updating module. The updating module is configured to update one or more features of the base emoticon and personalization based on the determined relationship between the users using a reinforcement model. The updating module is further configured to generate a class of one or more emoticons to represent the determined relationship.

In another embodiment, a method for generating a real-time context based emoticon includes a step of receiving, by a natural language processing (NLP) module, on-going conversation between at least two or more users, and analysing the conversation. The method includes a step of extracting, by an identification module, at least one attribute from the analysed conversation, wherein the attribute includes at least one of context, emotion, action, and intention of the conversation. The method includes a step of parsing, by the identification module, the attribute associated with the conversation, and identifying a subject, an action being performed during the conversation, and one or more accessories related to the attribute associated with the conversation. The method includes a step of predicting, by a prediction module, the intensity of the attribute using user behavior and a context associated with the conversation. The method includes a step of analysing, by an analysis module, the attribute and the intensity of the attribute associated with the conversation. The method includes a step of identifying, by a selection module, at least one relevant keyword associated with the context from the conversation, and selecting an emoticon from a plurality of pre-determined emoticons which is correlated with the attribute for the identified keyword. The method includes a step of identifying, by a converting module, an image content based on the attribute associated with the conversation, and converting the image content to a base emoticon using a machine learning translation model at the runtime. The method includes a step of generating, by a fiducial point locator, an output shape by determining one or more fiducial points of the base emoticon. The method includes a step of determining, by a determination module, one or more facial features represented by the output shape of the base emoticon. The method includes a step of generating, by a shape modeler, a set of motion vectors by using the one or more facial features, the identified attribute associated with the conversation and the generated output shape. The method includes a step of normalizing, by a normalization module, at least one motion vector and the generated output shape of the base emoticon. The method includes a step of transforming, by a GAN (generative adversarial networks) module, the normalized motion vector and the generated output shape of the base emoticon, and creating a transformed emoticon for the conversation.

In another embodiment, a real-time context based emoticon generation system includes a memory, a processor, and a processing engine. The memory is configured to store pre-defined rules. The processor is configured to generate system processing commands based on the pre-defined rules. The processing engine includes a natural language processing (NLP) module, a generation module, and a transformation module. The NLP module is configured to receive on-going conversation between at least two or more users, and is further configured to analyse the conversation. The NLP module includes an identification module, a prediction module, an analysis module, and a selection module. The identification module is configured to extract at least one attribute from the analysed conversation, wherein the attribute includes at least one of context, emotion, action, and intention of the conversation, and is configured to parse the attribute associated with the conversation, and identify a subject, an action being performed during the conversation, and one or more accessories related to the attribute associated with the conversation. The prediction module is configured to predict the intensity of the attribute using user behavior or user profile and a context associated with the conversation. The analysis module is configured to analyse the attribute and the intensity of the attribute associated with the conversation. The selection module is configured to identify at least one relevant keyword associated with the context from the conversation, and select an emoticon from a plurality of pre-determined emoticons which is correlated with the attribute. The generation module is configured to generate a base emoticon using the selected pre-determined emoticon. The generation module includes a converting module. The converting module is configured to identify an image content based on the attribute associated with the conversation, and convert the image content to the base emoticon using a machine learning translation model at the runtime. The transformation module includes a fiducial point locator, a determination module, a shape modeler, a normalization module, and a GAN (generative adversarial networks) module. The fiducial point locator is configured to generate an output shape by providing references of one or more fiducial points of the base emoticon. The determination module is configured to determine an emotion represented by the output shape of the base emoticon. The shape modeler is configured to generate a set of motion vectors by using the determined emoticon, the attribute associated with the conversation, and the generated output shape. The normalization module is configured to normalize at least one motion vector from the set of vectors and the generated output shape of the base emoticon. The GAN module is configured to transform the normalized motion vector and the generated output shape of the base emoticon, and create a transformed emoticon for the conversation.

FIG. 1 illustrates a block diagram depicting a real-time context based emoticon generation system (100), according to an embodiment.

A real-time context based emoticon generation system (hereinafter referred to as "system") (100) includes a memory (102), a processor (104), and a processing engine (106).

In an embodiment, one or more users are interacting with the system (100) by using an associated electronic device (not shown). In another embodiment, the electronic device includes, but is not limited to, a mobile phone, a cellphone, a laptop, a personal computer, and a tablet. The electronic device is communicatively coupled with the system (100) via a network (not shown). In one embodiment, the network includes wired and wireless networks. Examples of the wired networks include a Wide Area Network (WAN) or a Local Area Network (LAN), a client-server network, a peer-to-peer network, and so forth. Examples of the wireless networks include Wireless Fidelity (Wi-Fi) networks, a Global System for Mobile communications (GSM) network, and a General Packet Radio Service (GPRS) network, an enhanced data GSM environment (EDGE) network, 802.5 communication networks, Code Division Multiple Access (CDMA) networks, or Bluetooth networks.

The memory (102) is configured to store pre-determined rules related to pre-training of different modules, machine learning models, natural language processing, generation of emoticons, and transformation of emoticons. In an embodiment, the memory (102) can include any non-transitory computer-readable medium known in the art including, for example, volatile memory, such as static random-access memory (SRAM) and dynamic random-access memory (DRAM), and/or non-volatile memory, such as read only memory (ROM), erasable programmable (EPROM), flash memories, hard disks, optical disks, and magnetic tapes. The memory (102) also includes a cache memory to work with the system (100) more effectively.

The processor (104) is configured to cooperate with the memory (102) to receive the pre-determined rules. The processor (104) is further configured to generate system processing commands. In an embodiment, the processor (104) may be implemented as one or more microprocessors, microcomputers, microcontrollers, digital signal processors, central processing units, state machines, logic circuitries, and/or any devices that manipulate signals based on operational instructions. Among other capabilities, the at least one processor (104) is configured to fetch the pre-determined rules from the memory (102) and execute different modules of the system (100).

In an embodiment, the system (100) includes a database (148). The database (148) is configured to store a plurality of pre-determined emoticons and a plurality of accessories based on attributes. In an embodiment, the database (148) can be implemented as, but is not limited to, an enterprise database, a remote database, a local database, and the like. In one embodiment, the database (148) may themselves be located either within the vicinity of each other or may be located at different geographic locations. In another embodiment, the database (112) can be implemented as a single database. In one embodiment, the emoticons include smileys based on users' reactions during the conversation, such as happy, sad, excited, etc. The emoticons also include animals, nature, food and drink, activities, travel, locations, objects, symbols, currencies, gadgets, etc. In another embodiment, the accessories include wearable objects including hat, hear bands, googles, etc., and other objects including travel bags, glasses, transport vehicles, gaming accessories, food items, and the like.

The processing engine (106) is configured to cooperate with the processor (104) to receive the system processing commands and execute different modules. The processing engine (106) includes a natural language processing (NLP) module (108), a generation module (128), and a transformation module (132).

The NLP module (108) is configured to receive on-going conversation between at least two or more users from the electronic device, and is further configured to analyse the received conversation. In an embodiment, the on-going conversation can be in the form of, but is not limited to, text, audio, and video conversation. The NLP module (108) includes an identification module (110) and an analysis module (112).

The identification module (110) is configured to identify at least one attribute associated with the conversation. In an embodiment, the identification module (110) is configured to identify and parse the at least one attribute associated with the conversation. The identified attribute can be at least one context, emotion, and action associated with the conversation.

The analysis module (112) is configured to cooperate with the identification module (110) to receive and analyse the identified attribute associated with the conversation. The analysis module (112) includes a context determination module (114), a classification module (116), and a detection module (118). The context determination module (114) is configured to determine context associated with the conversation. The classification module (116) is configured to classify the identified emotion associated with the conversation into at least one emotional state. The detection module (118) is configured to detect at least one action associated the conversation.

In another embodiment, the NLP module (108) includes a selection module (120), a profile manager (122), an extractor (124), and a prediction module (126).

The selection module (120) is configured to select at least one pre-determined emoticon and at least one accessory based on the analysed attribute from the database (148). In an embodiment, the selection module (120) is configured to identify at least one relevant keyword associated with the context from the conversation, and is further configured to check a set of the pre-determined emoticons for the identified keyword from the database (148). The profile manager (122) is configured to manage profiles of each of the users associated with the conversation by determining a conversation style and relationship between the users. The extractor (124) is configured to extract information related to subject, an action being performed during the conversation, and one or more accessories related to the attribute. The prediction module (126) is configured to predict the intensity of the attribute by using user behavior and the profiles, and a context associated with the conversation.

The generation module (128) is configured to cooperate with the NLP module (108). The generation module (128) is further configured to generate a based emoticon using at least one of one or more inputs and a pre-determined emoticon. In an embodiment, the pre-determined emoticon is selected by the selection module (120) of the NLP module (108) based on the analysed attribute from the database (148). In an embodiment, the one or more inputs include, but are not limited to, the subject, the action, the accessories, the user profiles, relevant words, and objects. The generation module (128) includes a converting module (130). The converting module (130) is configured to identify an image content of the selected pre-determined emoticon based on the identified attribute associated with the conversation, and convert the image content to the base emoticon using a machine learning translation model. The machine learning translation model includes a neural machine translation model, a recurrent neural network model (RNN), an encoder-decoder model, and a deep learning artificial intelligence model.

The transformation module (132) is configured to cooperate with the NLP module (108) and the generation module (128). The transformation module (132) is configured to create the transformed emoticon for the conversation in real-time. In an embodiment, the transformation module (108) is configured to transform one or more convoluted features of the at least one pre-determined emoticon stored in the database (148) by morphing a pre-learnt transformation of a geometric shape of the transformed features based on the attributes. The transformation module (132) includes a fiducial point locator (134) and a Generative Adversarial Networks (GAN) module (136).

The fiducial point locator (134) is configured to determine one or more fiducial points of the base emoticon and generate an output shape of the base emoticon. In an embodiment, the fiducial point locator (134) is configured to generate the output shape of the base emoticon using a neural network.

The GAN module (136) is configured to cooperate with the fiducial point locator (134) to receive the output shape of the base emoticon. The GAN module (136) is configured to transform the output shape with an accessory, and create a transformed emoticon for the conversation. In an embodiment, the transformation module (136) is configured to transform the output shape with the selected accessory from the database (148).

The transformation module (132) includes a positioning module (138), a determination module (140), a shape modeler (142), a normalization module (144), and an updating module (146).

The positioning module (138) is configured to identify a position of the selected accessory in the base emoticon and create the transformed emoticon for the conversation. In an embodiment, the positioning module (138) is configured to compute weightage of the base emoticon and the attributes using a machine learning technique, and is further configured to identify the position of the selected accessory in the base emoticon.

The determination module (140) is configured to cooperate with the fiducial point locator (134) to receive the generated output shape. The determination module (140) is further configured to determine an emotion represented by the output shape of the base emoticon.

The shape modeler (142) is configured to cooperate with the fiducial point locator (134) and the determination module (140). The shape modeler (142) is configured to generate a set of motion vectors by using the determined emotion, the identified attribute associated with the conversation, and the generated output shape.

The normalization module (144) is configured to cooperate with the fiducial point locator (134) and the shape modeler (142). The normalization module (144) is further configured to normalize at least one motion vector from the set of vectors and the generated output shape of the base emoticon. In an embodiment, the GAN module (136) is configured to transform eh normalized motion vector and the generated output shape of the base emoticon, and is further configured to create the transformed emoticon for the conversation.

The updating module (146) is configured to update one or more features of the base emoticon and personalization based on the determined relationship between the users using a reinforcement model. In an embodiment, the reinforcement model is a reinforcement machine learning model. The updating module (146) is further configured to generate a class of one or more emoticons to represent the determined relationship. In one embodiment, the updating module (146) is intended to update the relationship/profile between a sender and a receiver associated with the conversation by using a reinforcement learning (RL) based model, on the basis of style of conversation and type of emoticons used.

Figure 2:
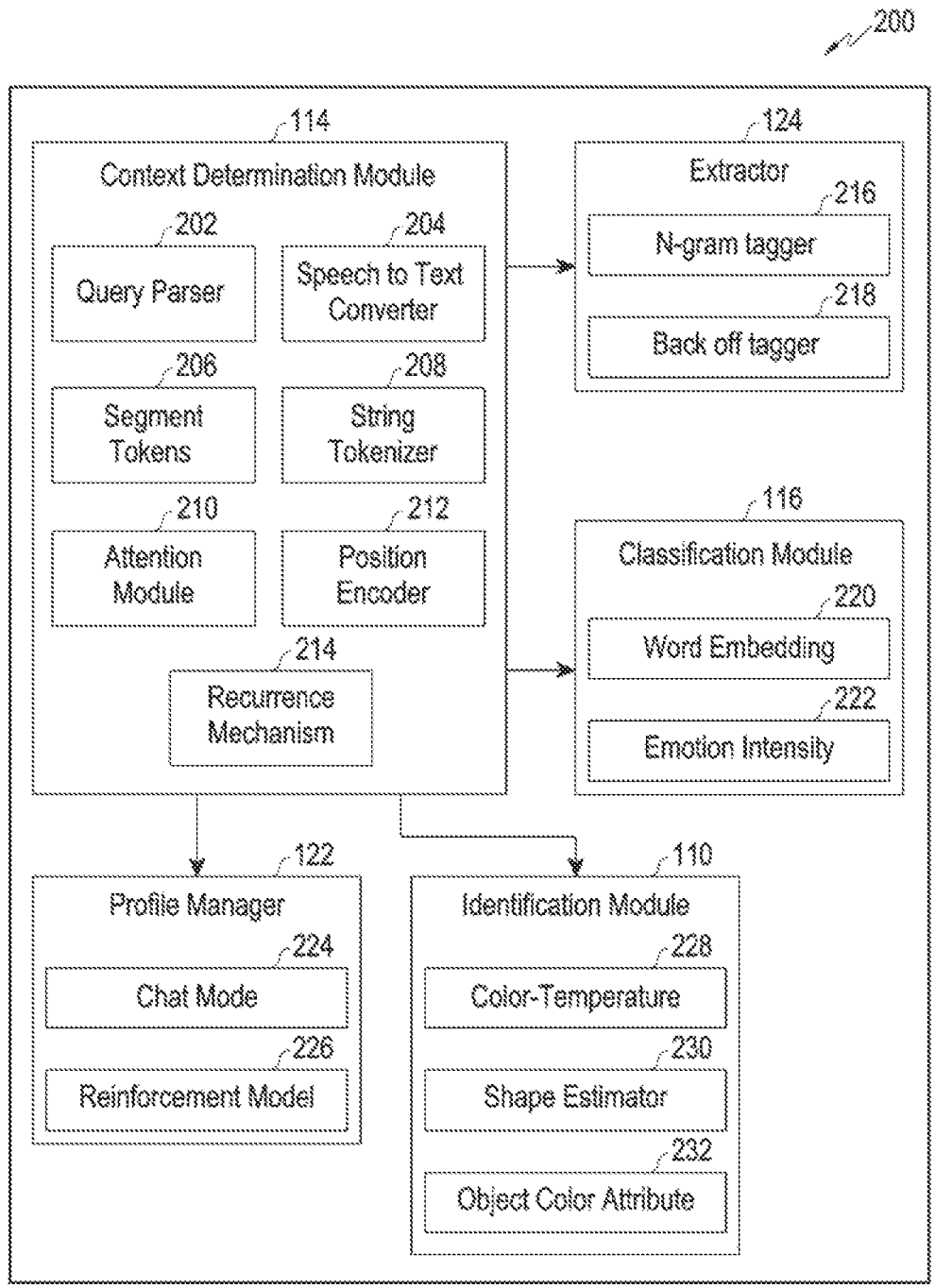
FIG. 2 illustrates a block diagram depicting various components of a natural language processing (NLP) module of FIG. 1, according to an embodiment.

FIG. 2 illustrates a block diagram (200) depicting various components of a natural language processing (NLP) module (108) of FIG. 1, according to an embodiment.

FIG. 2 illustrates various components of the natural language processing (NLP) module (108) of FIG. 1, which includes the context determination module (114) (as shown in FIG. 1), the extractor (124) (as shown in FIG. 1), the classification module (116) (as shown in FIG. 1), the profile manager (122) (as shown in FIG. 1), and the identification module (110).

The context determination module (114) is configured to determine context associated with the conversation. In an embodiment, the context determination module (114) is configured to extract the context of the conversation using a current conversation session between two or more users and user's behavior who are engaged in the current conversation session. In one embodiment, the context determination module (114) includes a query parser (202). The query parser is configured to parse the context and emotions associated with the current conversation session. Further, the context determination module (114) includes a speech to text converter (204) and a string tokenizer (208). The speech to text converter (204) is configured to convert audio/video form of conversation into text conversation, and is further configured to determine context associated with the conversation. The string tokenizer (208) is configured to break a string of the conversation into tokens. In another embodiment, the context determination module (114) is configured to tokenize the text/audio/video conversation into segments, and is further configured to create an attention module (210) for creating dependencies with previous form of text/audio/video conversation. The context determination module (114) is further configured to use a position encoder (212) and a recurrence mechanism (214) to extract and determine the context of the text/audio/video conversation. In an embodiment, the position encoder (212) is a relative position encoder that encodes a relative position of relevant segment tokens (206) or strings for extracting and determining the context of the conversation. The recurrence mechanism (214) is a segment level recurrence mechanism that uses previous history of the conversation for extracting and determining the context of the conversation. In an embodiment, the context includes purpose of the conversation, usage data, current activities of a user, pre-stored user data, time of the conversation, location of the user, real time conversation and current conversation details, previous history of conversation, relationship with other user who is engaged in the conversation, and frequency of the conversation between users.

The extractor (124) is configured to extract information related to subject, an action being performed during the conversation, and one or more accessories related to the identified attribute. In an embodiment, the extractor (124) is configured to extract information from the text/audio/video form of conversation, such as a subject, an action being performed, accessories related to the action or context, etc. In one embodiment, the extractor (124) is configured to use the current conversation session and a response of the user during the conversation session along with the context to extract the subject, the action being performed, and accessories associated with the conversation based on which the base emoticon is to be generated. In another embodiment, the extractor (126) uses an N-gram tagger (216) along with a back off tagger (218) to identify relevant subject and action from the conversation, and then identify the accessories relevant to the context or action being performed. In one embodiment, the accessories can vary based on the profile information of the user, chat style of the conversation, location, etc. In an embodiment, the N-gram tagger (216) assigns a tag for each segment token (206) that is most likely for that particular token. The back off tagger (218) allows to combine all the tags to identify the relevant subject, the action and the accessories.

The classification module (116) is configured to classify the identified emotion associated with the conversation into at least one emotional state. In an embodiment, the classification module (116) takes an emotion as an input along with the associated text/audio/video to identify the intensity of emotion associated with the conversation. In one embodiment, the classification module (116) uses a subject, verb, and object (SVO) architecture for word embedding (220) that contribute most to the emotion information of the conversation. Thereafter, the words are matched with the user behavior and a generalized set of intensity classifiers to identify an emotion intensity (222) being expressed in the conversation.

The profile manager (122) is configured to manage profiles of each of the users associated with the conversation by determining a conversation style and relationship between users. The profile manager (122) takes the overall context of the conversation to classify the conversation into at least one of the chat modes (224), i.e., formal, informal, friendly, and intimate. The mode of the conversation is learned through a reinforcement model (226), which is a reinforcement learning based model that learns from the user behavior. In addition, the user can also specify the chat mode (224) manually to generate an emoticon associated with the chat mode (224). In an embodiment, the profile manager (122) is configured to learn the personalized choices of the user while selecting a pre-determined emoticon to be sent to other person who is engaged in the conversation. It learns the class of emoticons being preferred most with respect to a particular situation so that the generated emoticon gives a personalized feeling to the user.

The identification module (110) is configured to identify at least one attribute associated with the conversation. In an embodiment, the identification module (110) includes a feature estimator that draws a contour over the plurality of emoticons and marks the emoticons with the associated features such as color, shape, objects, accessories, etc. on the basis of emotions, temperature, or attributes related to the emoticons as provided in the text/audio/video of the conversation. In an exemplary embodiment, the identification module (110) maps the identified attribute of an object (subject/accessory) with color on the basis of temperature, i.e., color-temperature (228), a shape on the basis of estimating features, i.e., a shape estimator (230), and an object on the basis of color and attribute, i.e., an object color attribute (232).

Figure 3:
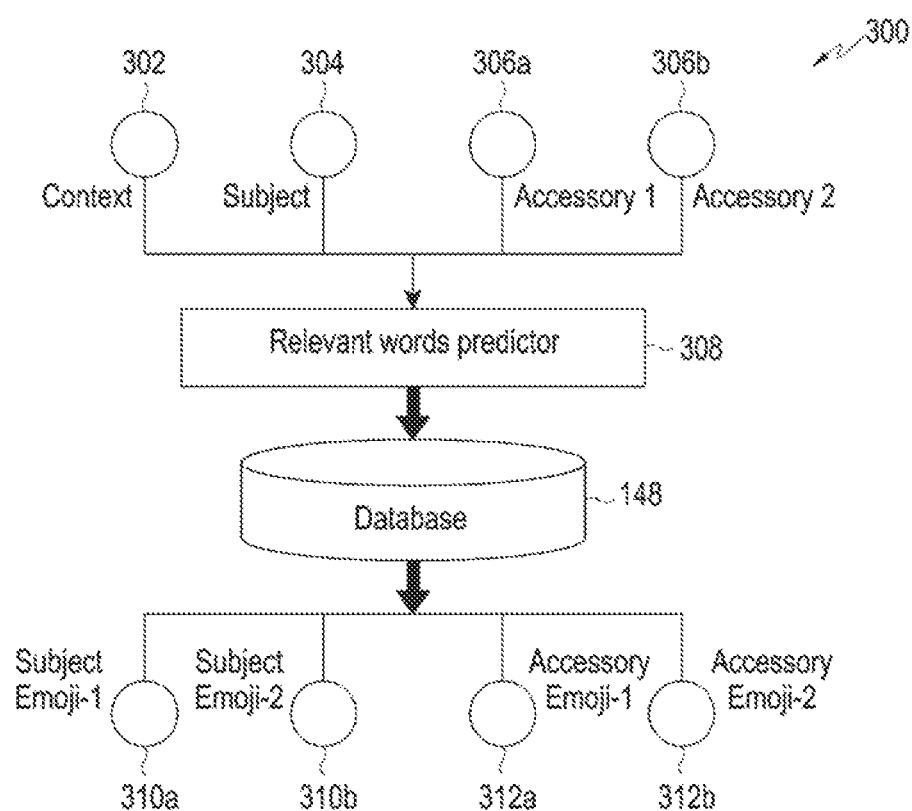
FIG. 3 illustrates a schematic diagram depicting generation of a base emoticon, according to an embodiment.

FIG. 3 illustrates a schematic diagram (300) depicting generation of a base emoticon, according to an embodiment.

In FIG. 3, a generation module (128) (as shown in FIG. 1) is configured to generate a base emoticon using at least one of one or more inputs and a pre-determined emoticon. In an embodiment, the generation module (128) is configured to receive one or more inputs including a context (302), a subject (304), an action, accessories (i.e., accessory 1 (306a) and accessory 2 (306b), and user profiles from the NLP module (108), and is further configured to determine words and objects related to the received inputs. From the database (148), a relevant words predictor (308) is configured to select a list of pre-determined base emoticons (Subject Emoji-1 (310a), Subject Emoji-2 (310b), Accessory Emoji-1 (312a), and Accessory Emoji-2 (312b)) that represent and/or can be transformed to represent the text/audio/video in an accurate way as per the user profile and the chat mode. If a certain emoticon is not determined, the relevant words predictor (308) performs an image search based on a keyword for which the emoticon was not determined and passes the image content to the converting module (130) (as shown in FIG. 1). The converting module (130) then converts the image content into a base emoticon using a machine learning translation model.

Figure 4:
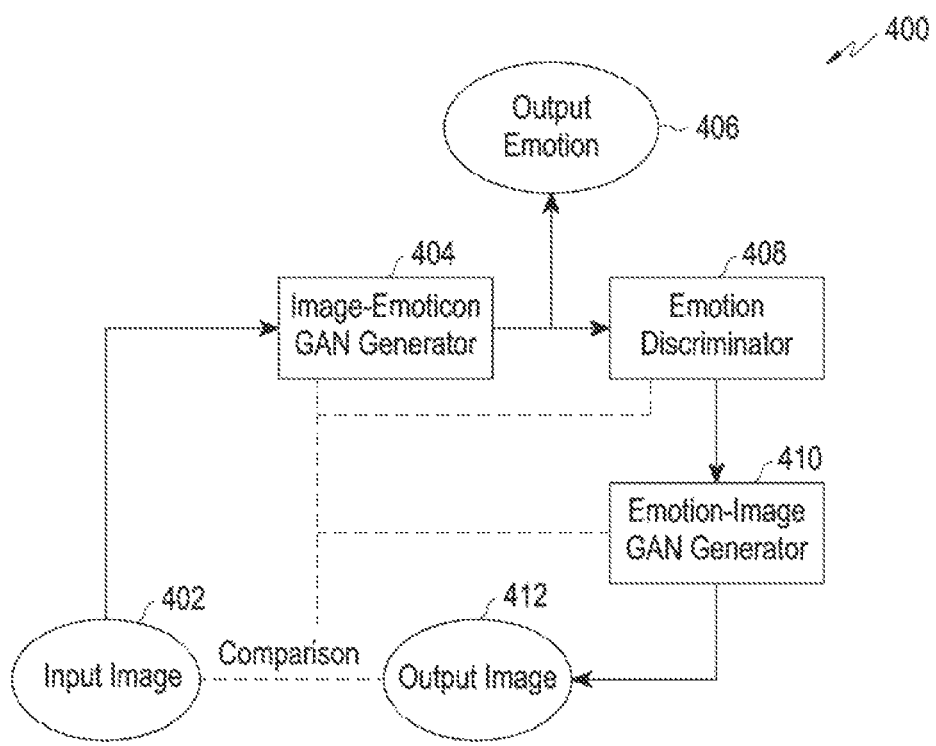
FIG. 4 illustrates a schematic diagram depicting a converting module of FIG. 1, according to an embodiment.

FIG. 4 illustrates a schematic diagram (400) depicting a converting module of FIG. 1, according to an embodiment.

A converting module (130) (as shown in FIG. 1) is configured to identify an image content of the pre-determined emoticon based on the attribute associated with the conversation, and convert the image content to the base emoticon using a machine learning translation model. In an exemplary embodiment, the converting module (130) takes an input image (402) and converts the input image (402) into an animated format (i.e., emoticon). In an embodiment, the converting module (130) includes two generators, i.e., an image-emoticon GAN generator (404) and an emoticon-image GAN generator (410), and an emoticon discriminator (408). The emoticon discriminator (408) classifies a set of pixels as an emoticon or a non-emoticon image. The image-emoticon GAN generator (404) is configured to generate an animated image from the input image (402) provided as an input. The feedback is provided from the emoticon discriminator (408). The output emoticon (406) generated by the image-emoticon GAN generator (404) is passed to the emoticon-image GAN generator (410) to translate the emoticon back to an original image. An output image (412) is generated by using the emoticon-image GAN generator (410), and is further compared against the original image and the feedback is provided to both the generators, i.e., the image-emoticon GAN generator (404) and the emoticon-image GAN generator (410), accordingly.

Figure 5:
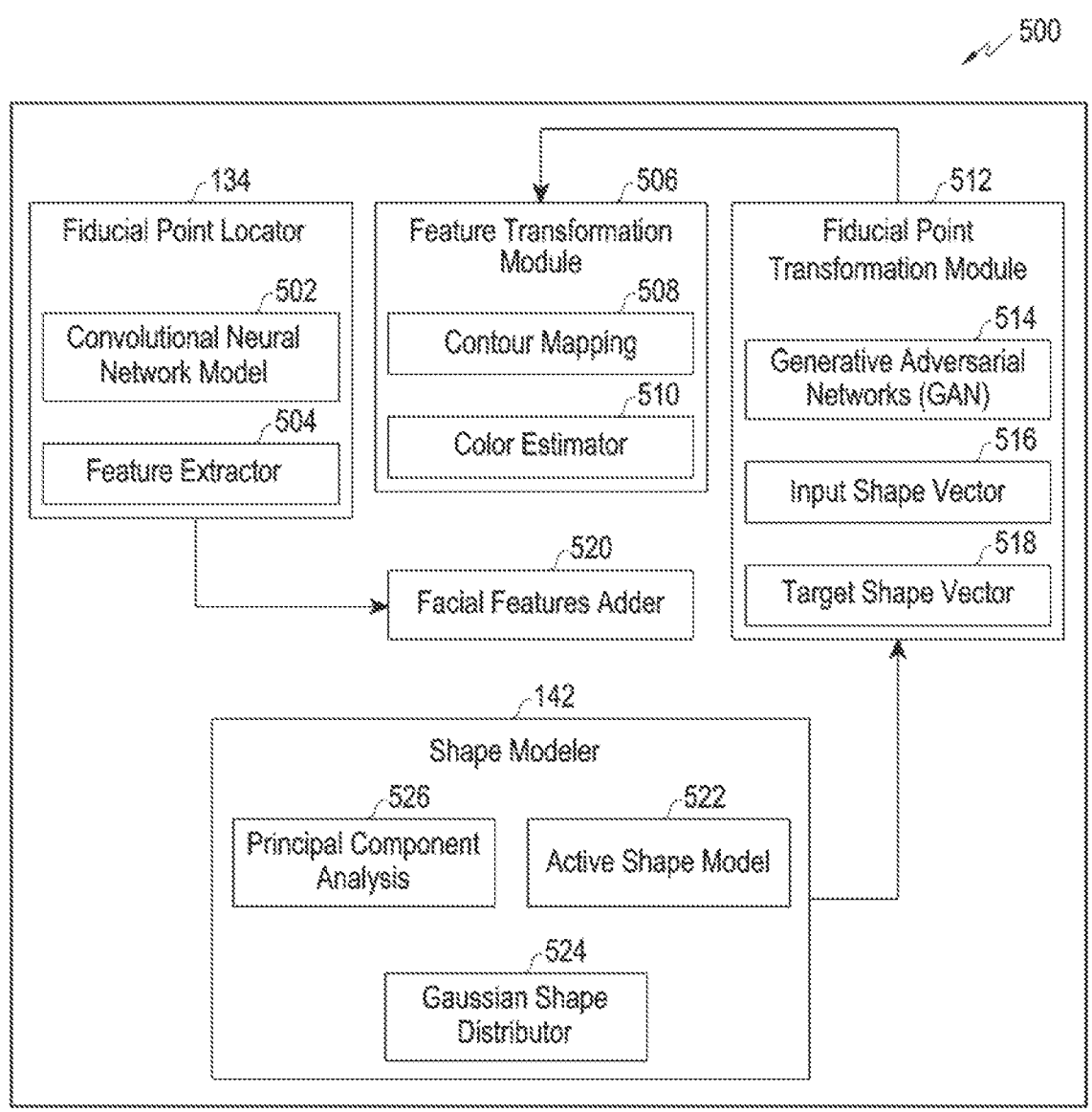
FIG. 5 illustrates a block diagram depicting various components of a transformation module of FIG. 1, according to an embodiment.

FIG. 5 illustrates a block diagram (500) depicting various components of a transformation module (132) of FIG. 1, according to an embodiment.

A transformation module (132) (as shown in FIG. 1) is configured to transform the output shape of the base emoticon with an accessory, and create a transformed emoticon for the conversation. The transformation module (132) includes a fiducial point locator (134), a feature transformation module (506), a fiducial point transformation module (512), a facial features adder (520), and a shape modeler (142).

The fiducial point locator (134) is configured to determine one or more fiducial points of the base emoticon and generate the output shape of the base emoticon. In an embodiment, the fiducial point locator (134) is pre-trained on a set of emoticons to mark the fiducial points that correspond to facial features like eyes, nose, ears, jaw, etc. The fiducial point locator (134) uses a Convolutional Neural network model (502) to extract the segmentation masks of the facial features, and a feature extractor (504) to extract a set of points from each feature which can represent the whole shape of the facial feature.

The feature transformation module (506) is pre-trained module with a set of base emoticons of same type and representing different emotions. The feature transformation module (506) takes as input, the shape of the features in a normalized form, input base emoticons and an emotion, and uses a machine learning based mapping model to map the motion vector of the shape corresponding to the specified emotion. In an embodiment, the feature transformation module (506) geometrically transforms the fiducial points recognized in the input base emoticons to a new shape which defines a specific emotion or a set of emotions. In one embodiment, the feature transformation module (506) also transforms the features based on attribute properties of the base emoticons. The feature transformation module (506) includes contour mapping (508) and a color estimator (510). The counter mapping (508) is used to determine the contour within an object/input whose features is to be changed for mapping the motion vector of the shape corresponding to the specified emotion. The color estimator (510) is used to change color features using the feature information for transforming the new shape.

The fiducial point transformation module (512) is configured to cooperate with the feature transformation module (506). The fiducial point transformation module (512) further is configured to receive the new shape and transform the new shape of the base emoticon. In an embodiment, the fiducial point transformation module (512) includes a Generative Adversarial Networks (GAN) (514) that transforms the shape of the base emoticon. The GAN (514) takes feedback from the emoticon discriminator (408) (as shown in FIG. 4), which is trained to determine the emotion based on the shape of facial features in the input. In an exemplary embodiment, the fiducial point transformation module (512) includes an input shape vector (516) and a target shape vector (518) that determine relevant position and size of the accessory emoticons with respect to the subject emoticons and then positions the accessory emoticons with respect to the subject emoticons accordingly to create transformed emoticons.

The facial features adder (520) is configured to cooperate with the fiducial point locator (134). If no facial features are identified in the base emoticon, the facial features adder (520) is configured to add facial features to the base emoticon or the new shape of the base emoticon.

The shape modeler (142) is configured to generate a set of motion vectors by using a determined emotion, the attribute associated with the conversation, and the generated output shape. In an embodiment, the shape modeler (142) is configured to generate the motion vector by using principal component analysis (PCA) technique (526), an active shape model (ASM) (522), and a Gaussian shape distributor (524). In an embodiment, when the fiducial points are determined, the shape modeler (142) learns the relative distance between the facial features and overall shape of the facial features using the active shape model (ASM). These shapes are then normalized using the Gaussian shape distributor (524).

Figure 6:
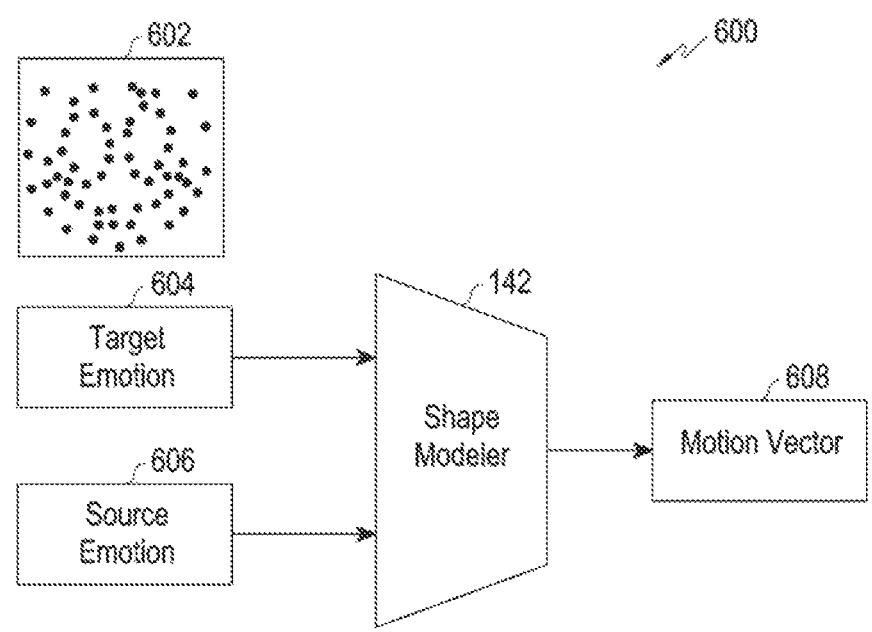
FIG. 6 illustrates a schematic diagram depicting motion vector and training shape modeler, according to an embodiment.

FIG. 6 illustrates a schematic diagram (600) depicting motion vector (608) and a training shape modeler, according to an embodiment.

In FIG. 6, a shape modeler (142) is a supervised learning based neural network which maps the relative change of the fiducial points with a change from source emotion (606) to target emotion (604), and represented by a motion vector (608). The motion vector for each fiducial point can be defined as the difference between the position of the fiducial point in source and target emotion. In the shape modeler (142), an input can be a set of fiducial points/output shape (602), target emotion (604), and source emotion (606), and the shape modeler (142) generates an output as a motion vector (608) for each set of fiducial points and a set of fiducial points/shape. In an exemplary embodiment, a motion vector (608) for a fiducial point can be defined as the displacement of that fiducial point relative to other fiducial points with respect to change in the expression of an emoticon. Let $\vec{F}=\{f_1, f_2, \ldots, f_n\}$ be the set of fiducial points representing a base shape of an emoticon, and $\vec{M}=\{m_1, m_2, m_3, \ldots, m_n\}$ be the set of motion vectors predicted by the shape modeler (142). Then, the predicted position of the fiducial points in the transformed shape can be calculated as:

$$\vec{F}'=\{f_1+m_1, f_2+m_2, \ldots, f_n+m_n\}.$$

Similarly, to retain the original shape, the motion vector can be inverted by going in the opposite direction of the transformation. That is, the inverse motion vector can be calculated as $\vec{M}^{-1}=-\vec{M}$. Let $\vec{F}''=\{f1'', f2'', \ldots, fn''\}$ be the respective expected fiducial points representing a target emotion (604). Then, the error in prediction of a fiducial point f can be calculated as:

$$\Delta f = (f''-f')^2 = (f''-f-m)^2.$$

The cost function for the shape modeler (142) can be hence defined as:

$$C=\Sigma_{i=1}^{n}\Delta fi2/n=\Sigma_{i=1}^{n}(fi''-fi-mi)^2/n$$

where, n is the number of fiducial points chosen to represent the shape (602).

Figure 7:
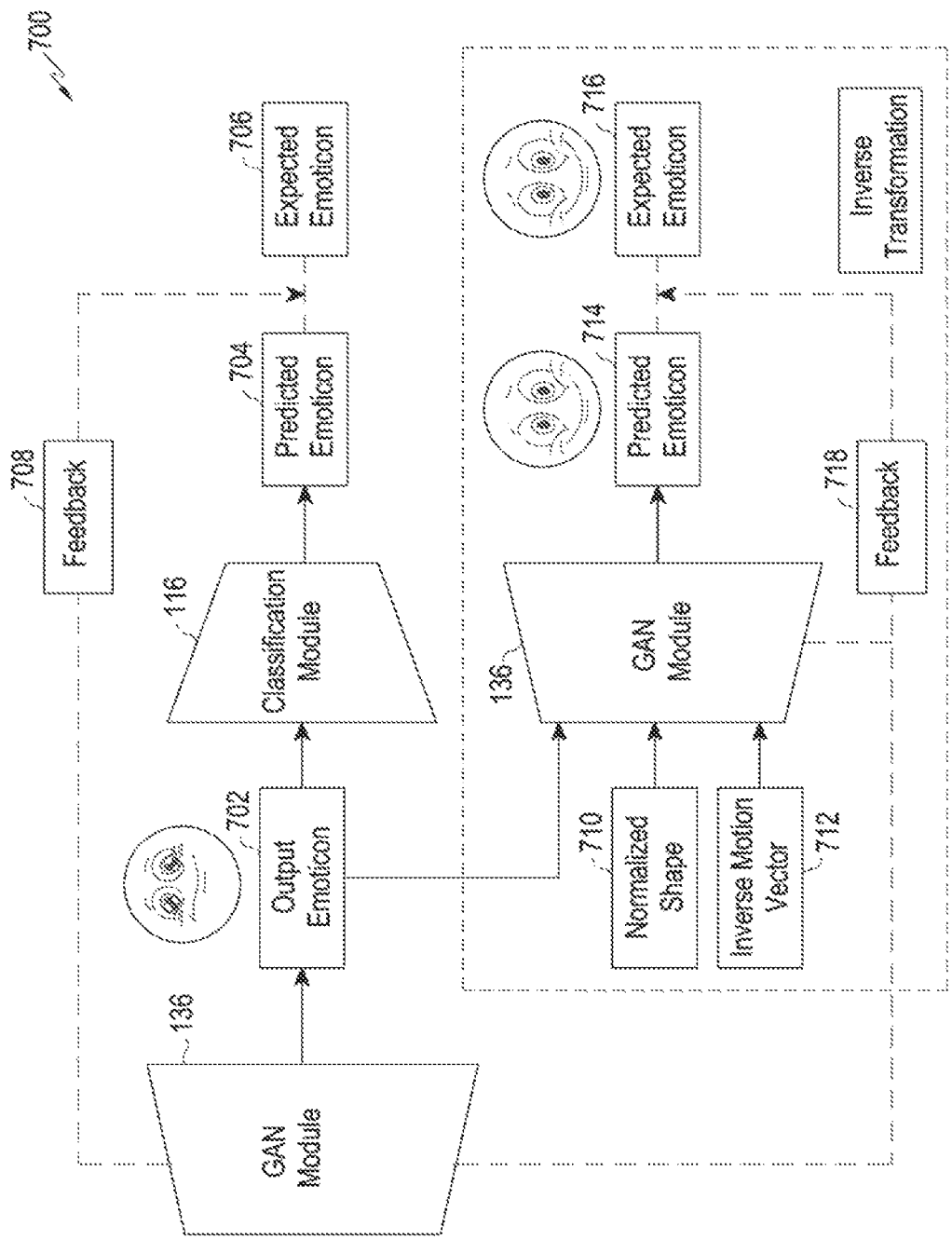
FIG. 7 illustrates a schematic diagram depicting inverse transformation for training of a GAN (generative adversarial networks) module, according to an embodiment.

FIG. 7 illustrates a schematic diagram (700) depicting inverse transformation for training of a GAN (generative adversarial networks) module (136), according to an embodiment.

In an exemplary embodiment, the objective function of a GAN module (136) is to depict the target emotion and resemble the input emoticon. To train the GAN module (136), the system (100) uses a semi-supervised learning mechanism that satisfies the objective function. The GAN module (136) is trained using the differences in the prediction of emotion with respect to the target emotion as well as using an inverse transformation to convert the target emoticon back into the source emoticon, and then the GAN module (136) is trained using the individual pixel differences between the predicted source emoticon and the actual source emoticon.

In an embodiment, the GAN module (136) is trained by trained by transforming the source emoticon to a target emoticon using a motion vector, and then performing the inverse transformation of the target emoticon to get the source emoticon using an inverse motion vector (712). The difference between the expected emoticon (716) and the predicted emoticon (714) is provided as a feedback (718) to the GAN module (136). Further, the output emoticon (702) is fed to the classification module (116) and the difference between a predicted emotion (704) and an expected emotion (706) is provided as feedback (708) to the GAN module (136).

In an exemplary embodiment, to satisfy the first objective function, the output emoticon (702) is fed to the classification module (116). Let the emotion vector predicted by the GAN module (136) be $\vec{E}_p=D(G(\vec{F}, \vec{M}))=\{e_1', e_2', \ldots, e_n'\}$ and let the target emotion vector be $\vec{E}_a=\{e_1, e_2, \ldots, e_n\}$, then the cost function is:

$$C1=\Sigma_{i=1}^{n}(\log(e_i)-\log(ei'))^2/n$$

For the second objective function, the system (100) uses the fiducial points of the output emoticon (702) and the inverse of the motion vector (712) to recreate the source emoticon. Let $\vec{F}=\{f_1, f_2, \ldots, f_n\}$ be the set of fiducial points representing the shape of transformed emoticon and $\vec{M}=m^{-1}_1, m^{-1}_2, m^{-1}_3, \ldots, m^{-1}_n$ be the set of inverse motion vectors in the direction of the source emoticon. These vectors are passed to the same GAN module (136) to recreate the source emoticon. Let the predicted source emoticon (714) be X' and actual source emoticon/expected source emoticon (716) be X, then the cost function for this objective is:

$$C2 = \sum_{\substack{0 \le i \le n \\ 0 < j < n}} (X'_0 - Xij)^2 / n$$

The overcall cost function is:

$$C = C_1 + C_2 = \sum_{i=1}^{n} (\log(e_i) - \log(ei'))^2 / n + \sum_{\substack{0 \le i \le n \\ 0 < j < n}} (X'_{ij} - Xij)^2 / n$$

Figure 8:
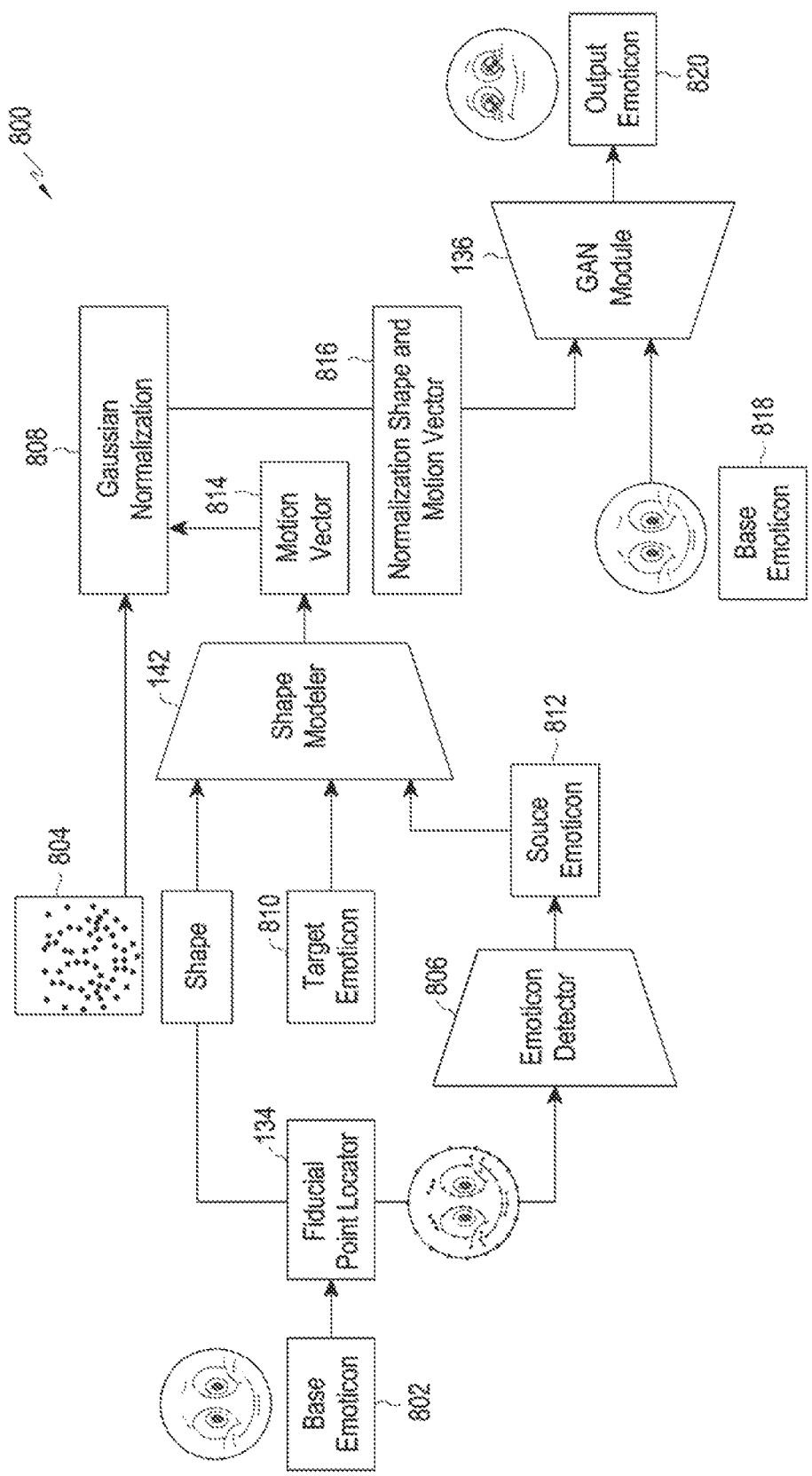
FIG. 8 illustrates a schematic diagram depicting a transformation module of FIG. 1 for transforming a base emoticon to an emoticon representing a target emotion, according to an embodiment.

FIG. 8 illustrates a schematic diagram (800) depicting a transformation module of FIG. 1 for transforming a base emoticon to an emoticon representing a target emotion, according to an embodiment.

In FIG. 8, a base emoticon (802) received from the generation module (128) is passed to the fiducial point locator (134). The output shape from the fiducial point locator (134) is then fed to an emotion detector (806) to determine the emotion represented by the base emoticon. The source emotion (812), target emoticon (810) (realized from the identified context), and the shape (804) of the base emoticon is fed to the shape modeler (142) to receive a set of motion vectors that represent the difference between the position of fiducial points in source and target emotion. The motion vector (814) and the shape of the base emoticon (818) are then normalized using Gaussian Normalization (808) to feed the geometry change information in the latent space of the GAN module (136). The GAN module (136) takes as an input the base emoticon (818), and normalized shape of the base emoticon and the motion vector (816). Using these parameters, the GAN module (136) transforms the base emoticon to an emoticon representing the target emotion.

Figure 9:
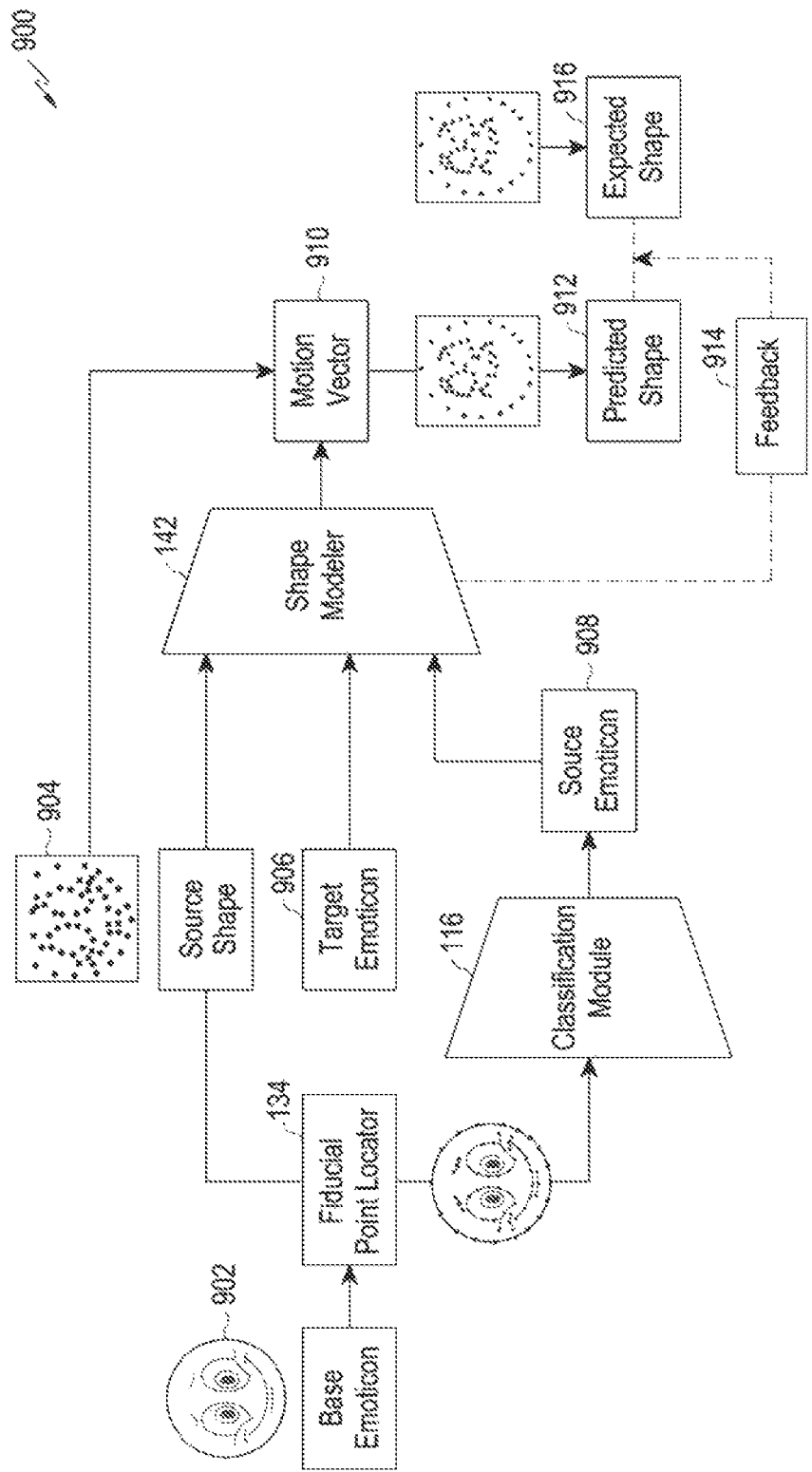
FIG. 9 illustrates a schematic diagram depicting training of a shape modeler of FIG. 1, according to an embodiment.

FIG. 9 illustrates a schematic diagram (900) depicting training of a shape modeler (142) of FIG. 1, according to an embodiment.

In FIG. 9, a base emoticon (902) received from the generation module (128) is passed to the fiducial point locator (134). The output shape from the fiducial point locator (134) is then fed to a classification module (116) to determine a source emotion (908) represented by the base emoticon. The source emotion (908), target emoticon (906) (realized from the identified context), and the source shape (904) of the base emoticon is fed to the shape modeler (142) to receive a set of motion vectors that represent the difference between the position of fiducial points in source and target emotion. The shape modeler (142) is trained using a supervised learning mechanism with a labeled database (148) of shapes of emoticons of a particular class (for example, Android®, iOS® etc.). The motion vector (910) is applied to the input/source shape (904) to get a predicted shape (912). The difference between the predicted shape (912) and an expected shape (916) is provided as a feedback (914) to the shape modeler (142).

Figure 10:
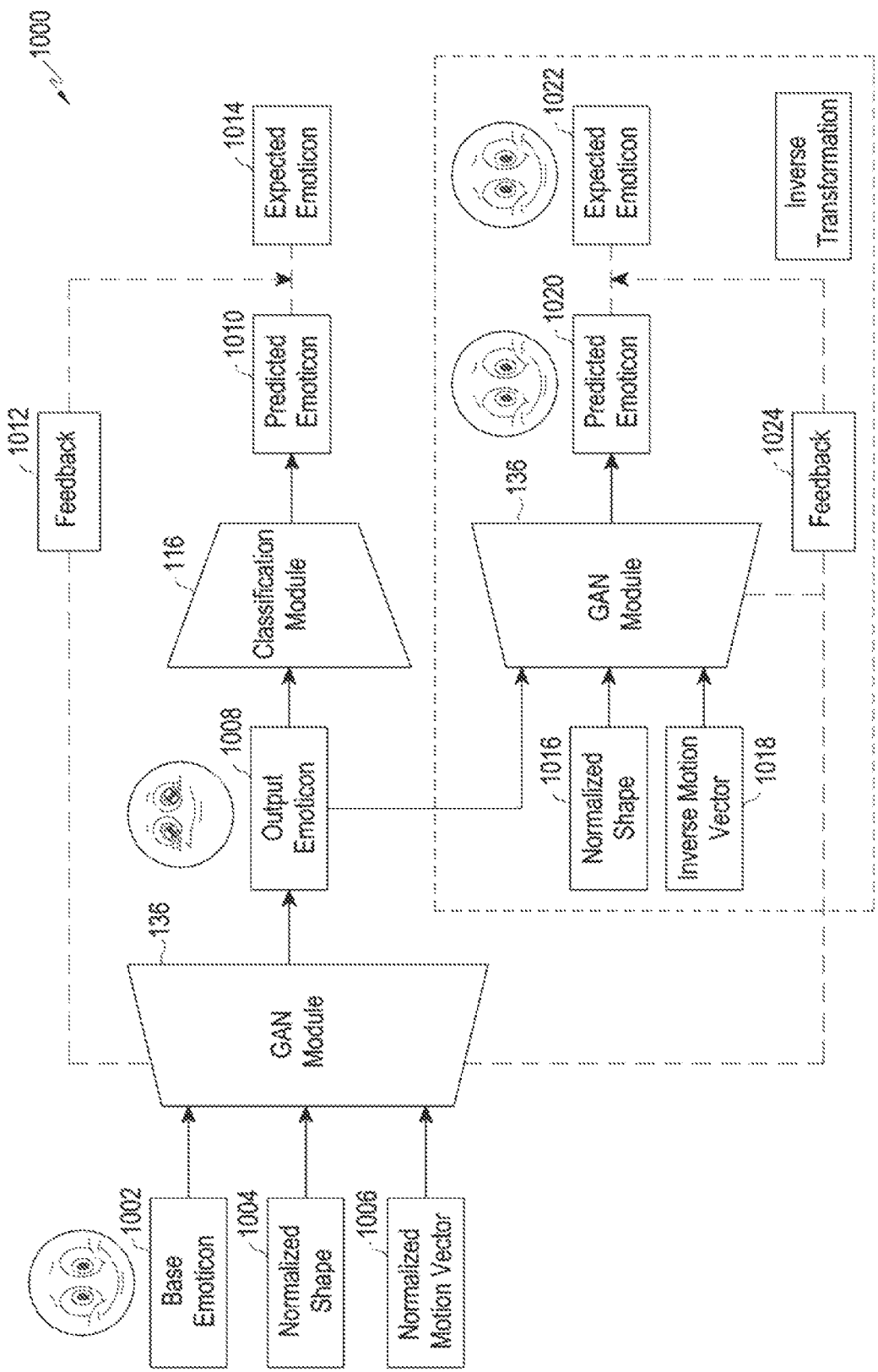
FIG. 10 illustrates a schematic diagram depicting training of a GAN (generative adversarial networks) module using a motion vector, according to an embodiment.

FIG. 10 illustrates a schematic diagram (1000) depicting training of a GAN (generative adversarial networks) module (136) using a motion vector, according to an embodiment.

In FIG. 10, a base emoticon (1002), normalized shape (1004), and normalized input vector (1006) are fed to a GAN module (136). The GAN module generates a transformed/output emoticon (1008). The GAN module (136) is trained by firstly transforming a source emoticon to a target emoticon using the motion vector. Then, inverse transformation of the target emoticon is performed to get the source emoticon using an inverse motion vector (1018). The normalized shape (1016) and the inverse motion vector (1018) are fed in the GAN module (136). The GAN module (136) generates a predicted emoticon (1020). The difference between an expected emoticon (1022) and the predicted emoticon (1020) is provided as a feedback (1024) to the GAN module (136). Also, the transformed emoticon/output emoticon (1008) is fed to the classification module (116) and the difference between the expected emotion (1014) and the predicted emotion (1010) are provided as feedback (1012) to the GAN module (136).

Figure 11:
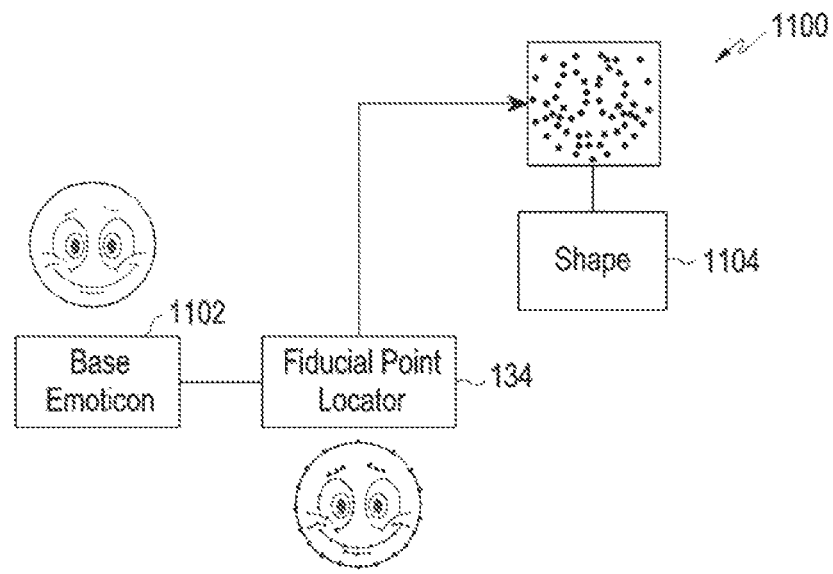
FIG. 11 illustrates a schematic diagram depicting a fiducial point locator of a transformation module of FIG. 1, according to an embodiment.

FIG. 11 illustrates a schematic diagram (1100) depicting a fiducial point locator (134) of a transformation module (132) of FIG. 1, according to an embodiment.

In an embodiment, a fiducial point locator (134) is a pre-trained neural network that locates the co-ordinates of pixels which are sufficient to map the shape of the emoticon/base emoticon. The fiducial point locator (134) determines a set of pixels responsible for defining facial features such as eyes, nose, mouth, hair, etc. and provides reference of fiducial points of the base emoticon. The base emoticon (1102) is fed into the fiducial point locator (134). The fiducial point locator (134) determines one or more fiducial points of the base emoticon (1102) and generates an output shape (1104) of the base emoticon (1102).

Figure 12:
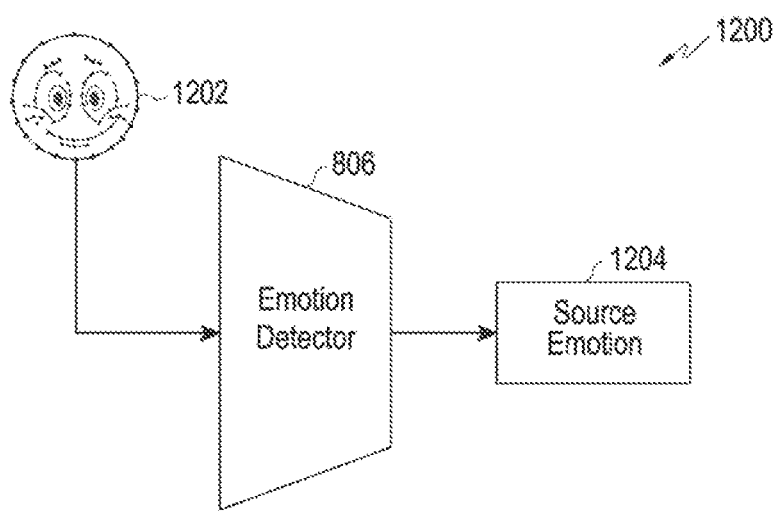
FIG. 12 illustrates a schematic diagram depicting an emotion detector, according to an embodiment.

FIG. 12 illustrates a schematic diagram (1200) depicting an emotion detector (806), according to an embodiment.

In an embodiment, an emotion detector (806) is a pre-trained classifier that classifies emotions represented by a base emoticon using a shape extracted from a fiducial point locator (134). A set of fiducial points of the base emoticon (1202) is fed in the emotion detector (806). The emotion detector (806) is configured to generate an emotion vector represented by the shape, and provide a source emotion (1204).

Figure 13:
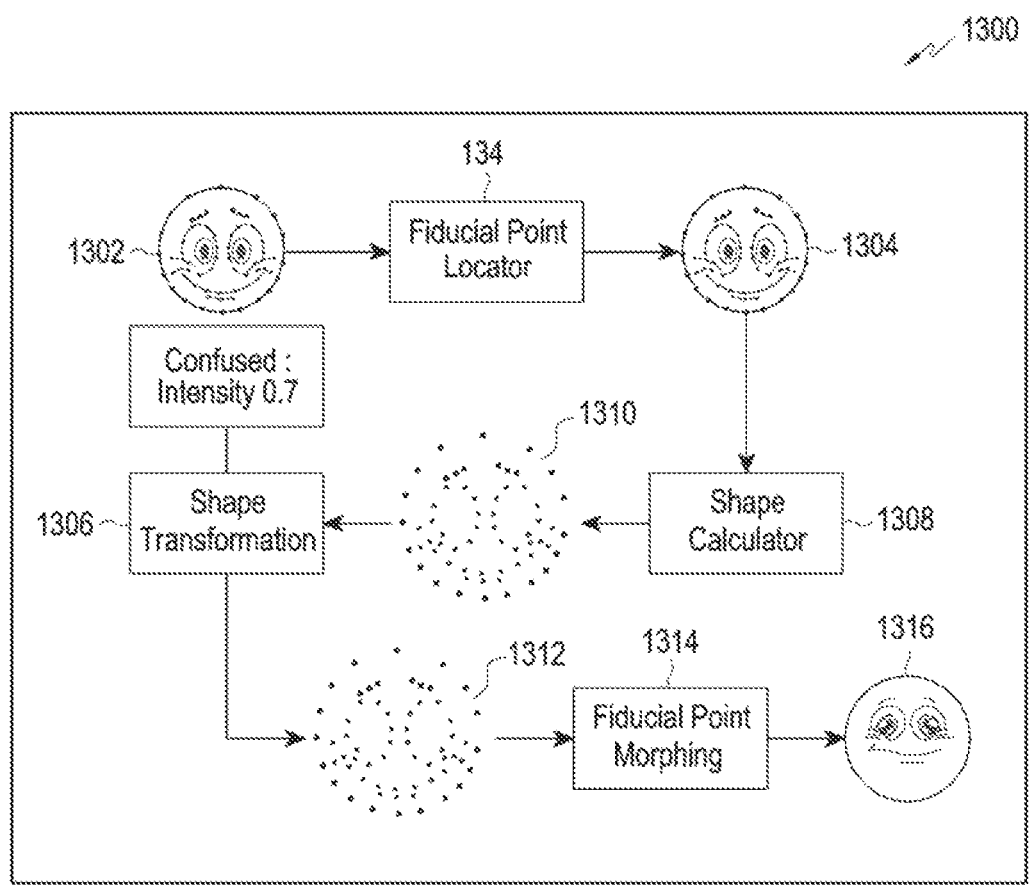
FIG. 13 illustrates a schematic diagram depicting transformation of an emoticon based on feature transformation, according to an embodiment.

FIG. 13 illustrates a schematic diagram (1300) depicting transformation of an emoticon based on feature transformation, according to an embodiment.

In an embodiment, feature transformation changes features of an emoticon such as colors, shape, objects, accessories of a subject, and accessories using a feature information. In FIG. 13, a base emoticon (1302) received from a generation module (128) is fed in a fiducial point locator (134). The fiducial point locator (134) determines one or more fiducial points of the base emoticon (1302). A shape calculator (1308) then calculates positions of the fiducial points, and generates an output shape (1310) of the base emoticon (1302). The shape transformation (1306) checks the shape of the features and the shape is transformed on the basis of certain attributes like emotions, actions, and context of the conversation. For example, the shape transformation (1306) determines the intensity of the attribute of the output shape (1310) by using the user behavior and the profiles, and the context, and determines that the user is confused and the intensity of the shape is 0.7. Then, the shape transformation (1306) maps the change in the fiducial points to the actual change. The shape transformation (1306) takes the shape of the base emoticon, normalizes the shape, takes a motion vector, and maps the transformation in the base emoticon with respect to change in the fiducial points (1312). A fiducial point morphing (1314) is performed on appropriate geometric representations of a new emoticon (1316) to express the sentiment. In an embodiment, real-time generation and transformation of a personalized new emoticon is performed by learning how the shape of the features are transformed on the basis of certain attributes like emotions, actions, and context of the conversation, and appropriate geometric representations on a new emoticon are morphed to express the sentiment. In one embodiment, transformation of emoticon is based on sender-receiver relationship associated with the conversation.

Figure 14:
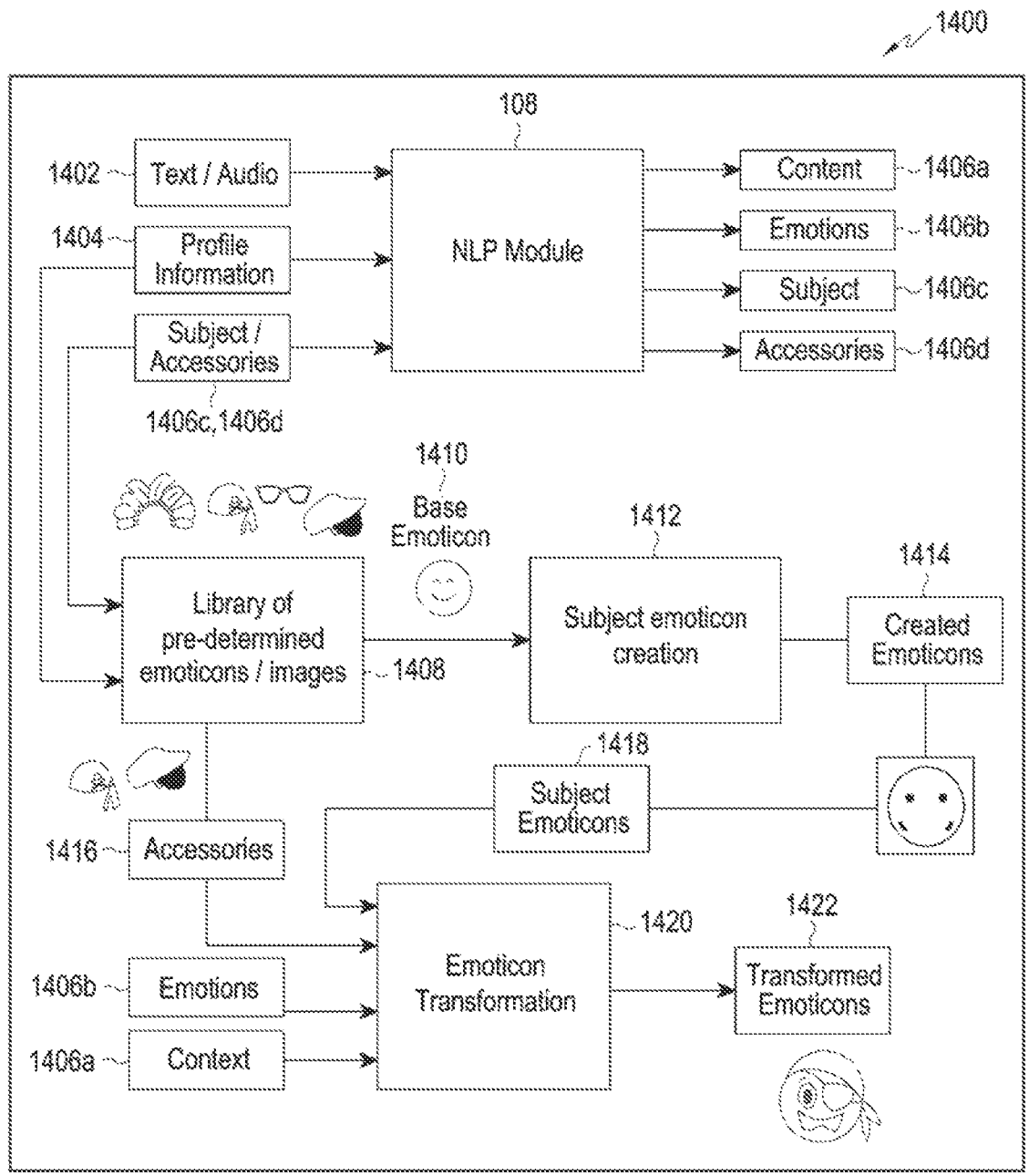
FIG. 14 illustrates a schematic diagram depicting generation and transformation of an emoticon, according to an embodiment.

FIG. 14 illustrates a schematic diagram (1400) depicting generation and transformation of an emoticon, according to an embodiment.

In an exemplary embodiment, a system (100) receives an on-going conversation in the form of text/audio (1402) and profile information (1404) of users who are associated with the conversation. The system (100) then identifies at least one attribute associated with the conversation, which includes content (1406a), emotions (1406b), subject (1406c), and accessories (1406d). The NLP module (108) identifies at least one attribute associated with the conversation, for example subject/accessories (1406c, 1406d). The system (100) includes a library (1408) which stores a plurality of pre-determined emoticons/images and a plurality of accessories based on attributes. The system (100) then selects at least one pre-determined emoticon and accessories based on the identified attributes from the library (1408). The system (100) generates a base emoticon (1410) using the selected pre-determined emoticon. In an embodiment, the system (100), by using a current conversation session and conversation mode, extracts attributes from the conversation, and performs text parsing to obtain the subject, verbs (actions), and accessories associates with a current response of a user. In another embodiment, the system (100) then selects an emoticon from a library (1408) which is most correlated with the context of the conversation, for example subject/accessories (1406c, 1406d). If no emoticon is found for a specific object, the system (100) creates a new emoticon using an image to image translation model, and consider as a base emoticon. The system (100) identifies the image content in the conversation based on the attributes that correlates with the conversation, and translates the selected image to an emoticon using a pre-trained image to image translation model. The system (100) creates emoticons (1414) using the base emoticon (1410) as a subject emoticon (1412). The system (100) identifies the facial features based on a shape of the subject emoticon (1418). The system (100) transforms the subject emoticon (1418) (at a block 1420) with the selected accessories (1416) from the library (1408) using attributes such as emotions (1406b, 1406a) and creates a transformed emoticon (1422) for the conversation.

Figure 15:
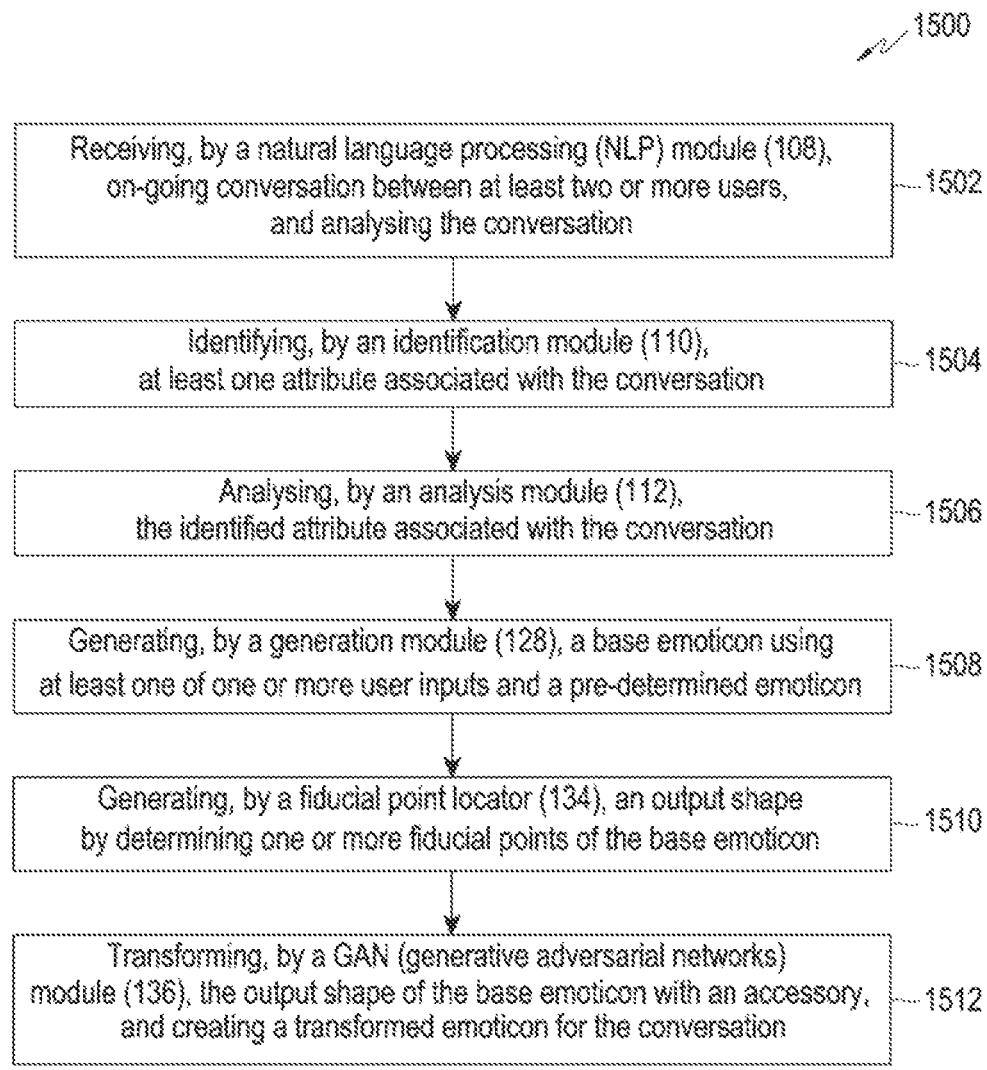
FIG. 15 illustrates a flowchart depicting a method for generating a real-time context based emoticon, according to an embodiment.

FIG. 15 illustrates a flowchart (1500) depicting a method for generating a real-time context based emoticon, according to an embodiment.

The flowchart (1500) starts at a step (1502), the method includes receiving, by a natural language processing (NLP) module (108), on-going conversation between at least two or more users, and analysing the conversation. In an embodiment, a natural language processing (NLP) module (108) is configured to receive on-going conversation between at least two or more users, and analyse the conversation. At a step (1504), the method includes identifying, by an identification module (110), at least one attribute associated with the conversation. In an embodiment, an identification module (110) is configured to identify at least one attribute associated with the conversation. At a step (1506), the method includes analysing, by an analysis module (112), the identified attribute associated with the conversation. In an embodiment, an analysis module (112) is configured to analyse the identified attribute associated with the conversation. At a step (1508), the method includes generating, by a generation module (128), a base emoticon using at least one of one or more user inputs and a pre-determined emoticon. In an embodiment, a generation module (128) is configured to generate a base emoticon using at least one of one or more user inputs and a pre-determined emoticon. At a step (1510), the method includes generating, by a fiducial point locator (134), an output shape by determining one or more fiducial points of the base emoticon. In an embodiment, a fiducial point locator (134) is configured to generate an output shape by determining one or more fiducial points of the base emoticon. At a step (1512), the method includes transforming, by a GAN (generative adversarial networks) module (136), the output shape of the base emoticon with an accessory, and creating a transformed emoticon for the conversation. In an embodiment, a GAN (generative adversarial networks) module (136) is configured to transform the output shape of the base emoticon with an accessory, and create a transformed emoticon for the conversation.

Figure 16A:
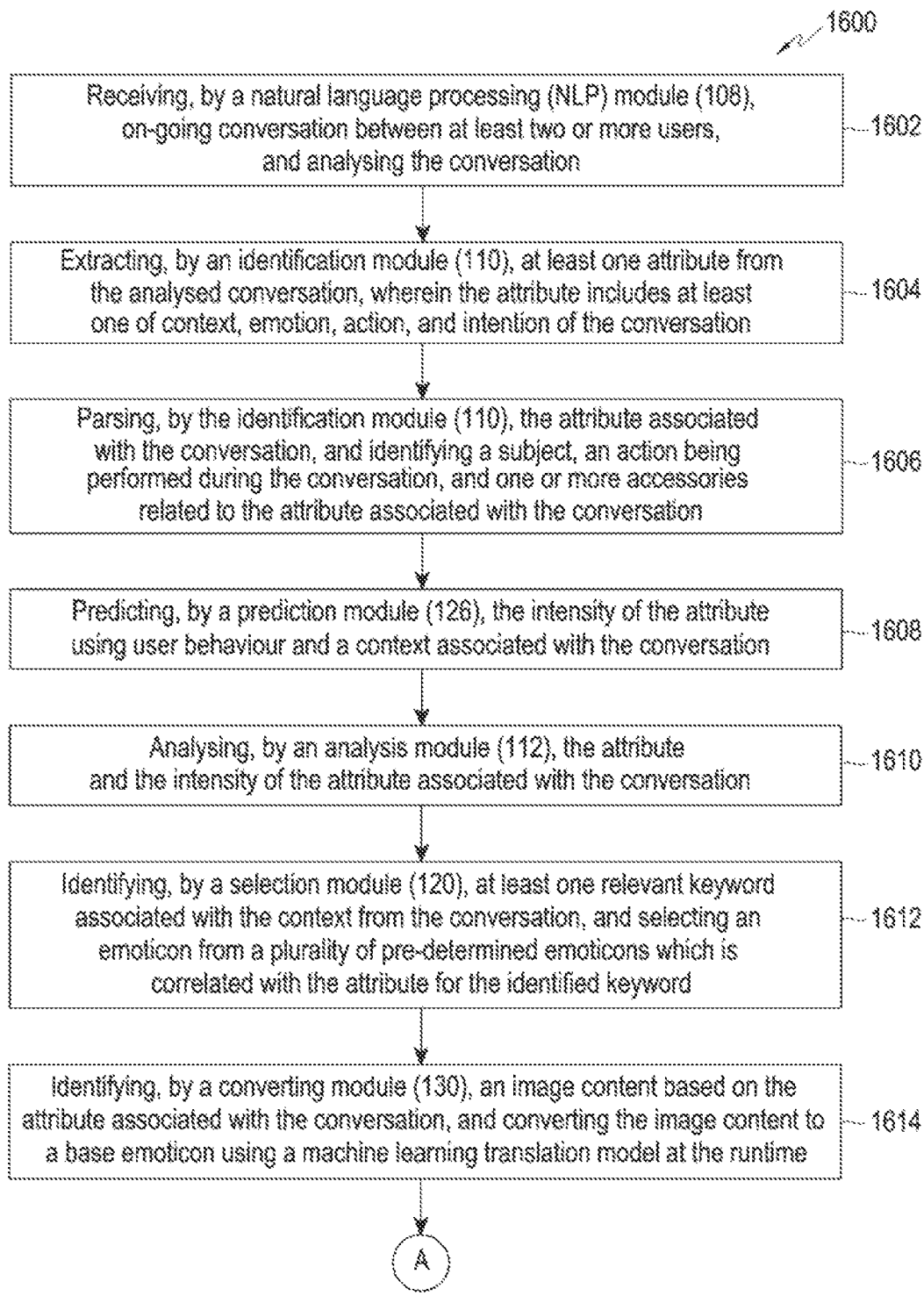
FIGS. 16A and 16B illustrate a flowchart depicting a method for generating a real-time context based emoticon by extracting attributes, according to an embodiment.
Figure 16B:
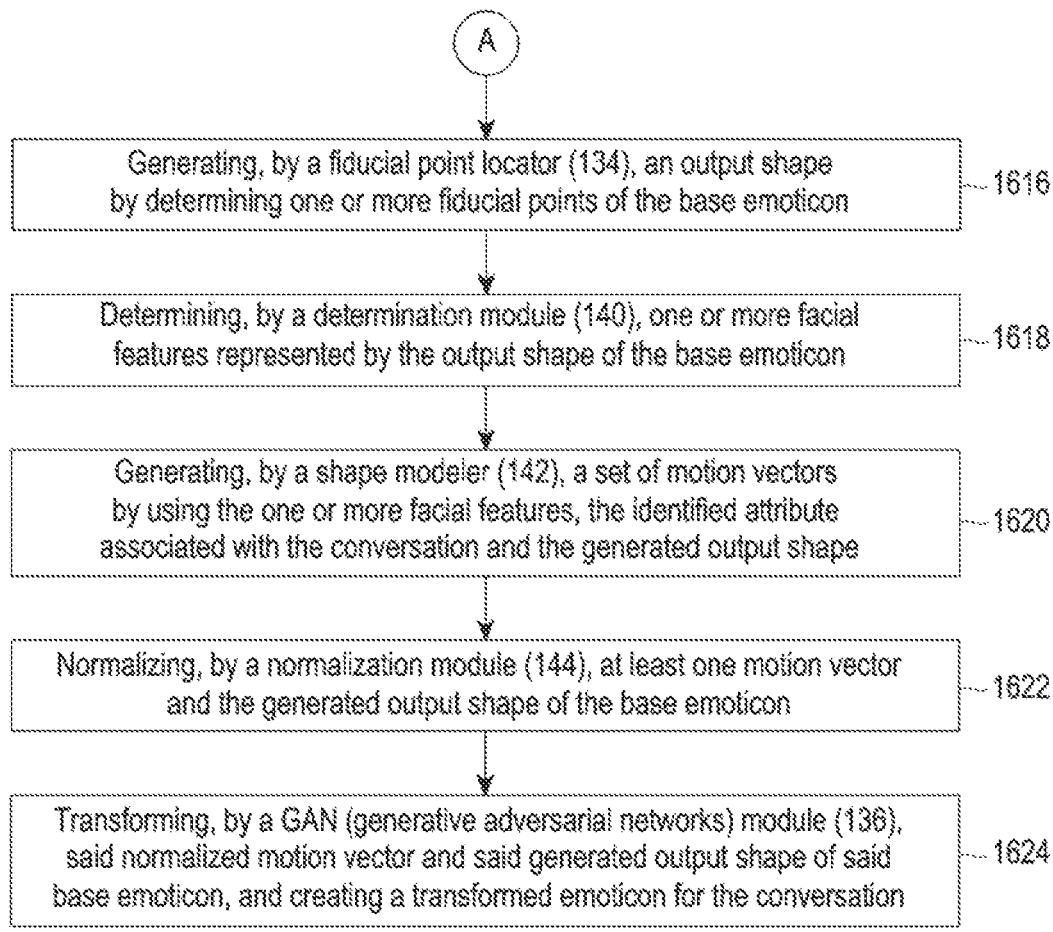

FIG. 16 illustrates a flowchart (1600) depicting a method for generating a real-time context based emoticon by extracting attributes, according to an embodiment.

At a step (1602), the method includes receiving, by a natural language processing (NLP) module (108), on-going conversation between at least two or more users, and analysing the conversation. In an embodiment, a natural language processing (NLP) module (108) is configured to receive on-going conversation between at least two or more users, and analyse the conversation. At a step (1604), the method includes extracting, by an identification module (110), at least one attribute from the analysed conversation, wherein the attribute includes at least one of context, emotion, action, and intention of the conversation. In an embodiment, an identification module (110) is configured to extract at least one attribute from the analysed conversation, wherein the attribute includes at least one of context, emotion, action, and intention of the conversation. At a step (1606), the method includes parsing, by the identification module (110), the attribute associated with the conversation, and identifying a subject, an action being performed during the conversation, and one or more accessories related to the attribute associated with the conversation. In an embodiment, the identification module (110) is configured to parse and identify a subject, an action being performed during the conversation, and one or more accessories related to the attribute associated with the conversation. At a step (1608), the method includes predicting, by a prediction module (126), the intensity of the attribute using user behavior and a context associated with the conversation. In an embodiment, a prediction module (126) is configured to predict the intensity of the attribute using user behavior and a context associated with the conversation. At a step (1610), the method includes analysing, by an analysis module (112), the attribute and the intensity of the attribute associated with the conversation. In an embodiment, an analysis module (112) is configured to analyse the attribute and the intensity of the attribute associated with the conversation. At a step (1612), the method includes identifying, by a selection module (120), at least one relevant keyword associated with the context from the conversation, and selecting an emoticon from a plurality of pre-determined emoticons which is correlated with the attribute for the identified keyword. In an embodiment, a selection module (120) is configured to identify at least one relevant keyword associated with the context from the conversation, and select an emoticon from a plurality of pre-determined emoticons which is correlated with the attribute for the identified keyword. At a step (1614), the method includes identifying, by a converting module (130), an image content based on the attribute associated with the conversation, and converting the image content to a base emoticon using a machine learning translation model at the runtime. In an embodiment, a converting module (130) is configured to identify an image content based on the attribute associated with the conversation, and convert the image content to a base emoticon using a machine learning translation model at runtime. At a step (1616), the method includes generating, by a fiducial point locator (134), an output shape by determining one or more fiducial points of the base emoticon. In an embodiment, a fiducial point locator (134) is configured to generate an output shape by determining one or more fiducial points of the base emoticon. At a step (1618), the method includes determining, by a determination module (140), one or more facial features represented by the output shape of the base emoticon. In an embodiment, a determination module (140) is configured to determine one or more facial features represented by the output shape of the base emoticon. At a step (1620), the method includes generating, by a shape modeler (142), a set of motion vectors by using the one or more facial features, the identified attribute associated with the conversation and the generated output shape. In an embodiment, a shape modeler (142) is configured to generate a set of motion vectors by using the one or more facial features, the identified attribute associated with the conversation and the generated output shape. At a step (1622), the method includes normalizing, by a normalization module (144), at least one motion vector and the generated output shape of the base emoticon. In an embodiment, a normalization module (144) is configured to normalize at least one motion vector and the generated output shape of the base emoticon. At a step (1624), the method includes transforming, by a GAN (generative adversarial networks) module (136), the normalized motion vector and the generated output shape of the base emoticon, and creating a transformed emoticon for the conversation. In an embodiment, a GAN (generative adversarial networks) module (136) is configured to transform the normalized motion vector and the generated output shape of the base emoticon, and create a transformed emoticon for the conversation.

Figure 17:
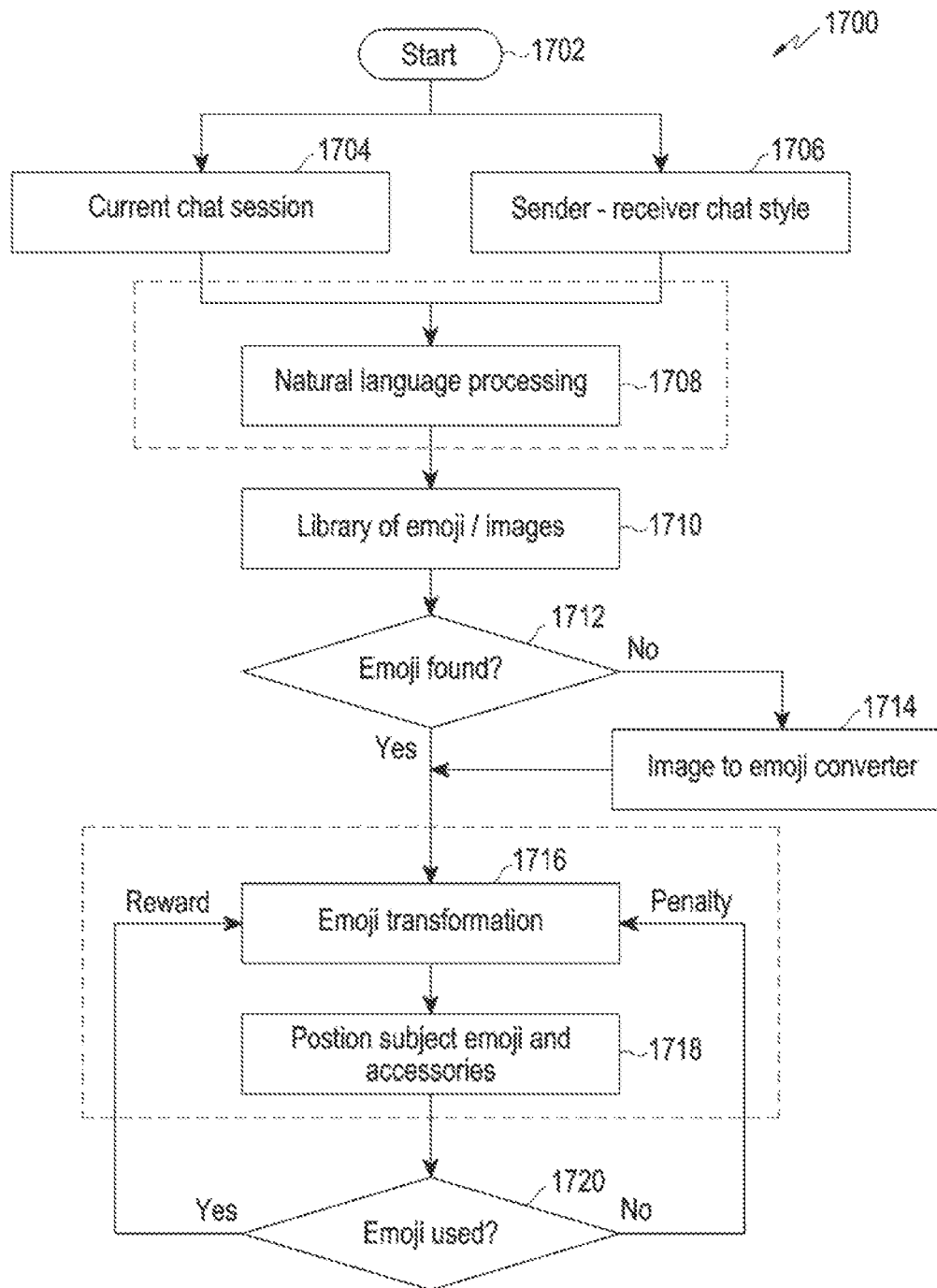
FIG. 17 illustrates a flow diagram depicting a real-time context based emoticon generation system of FIG. 1, according to an embodiment.

FIG. 17 illustrates a flow diagram (1700) depicting a real-time context based emoticon generation system of FIG. 1, according to an embodiment.

The flow diagram starts at a step (1702). At a step (1708), a natural language processing (NLP) module (108) receives inputs including a current chat session (1704) and a sender-receiver chat style (1706) associated with a conversation. At a step (1710), a library stores a plurality of pre-determined emoticons and images. At a step (1712), a generation module (108) checks whether the emoticon is found in the library or not. If the emoticon is not found, then the generation module (108) converts an image to an emoticon by using an image to emoticon converter, as shown at a step (1714). If the emoticon is found, a transformation module (132) transforms the emoticon, as shown at a step (1716). At a step (1718), a positioning module (138) positions subject emoticon and accessories. At a step (1720), the transformation module (132) checks whether the emoticon is used or not. If the emoticon is used, the transformation module (132) generates a reward and returns to the step (1716) and repeats the process. If the emoticon is not used, the transformation module (132) generates a penalty and returns to the step (1716) and repeats the process.

Figure 18:
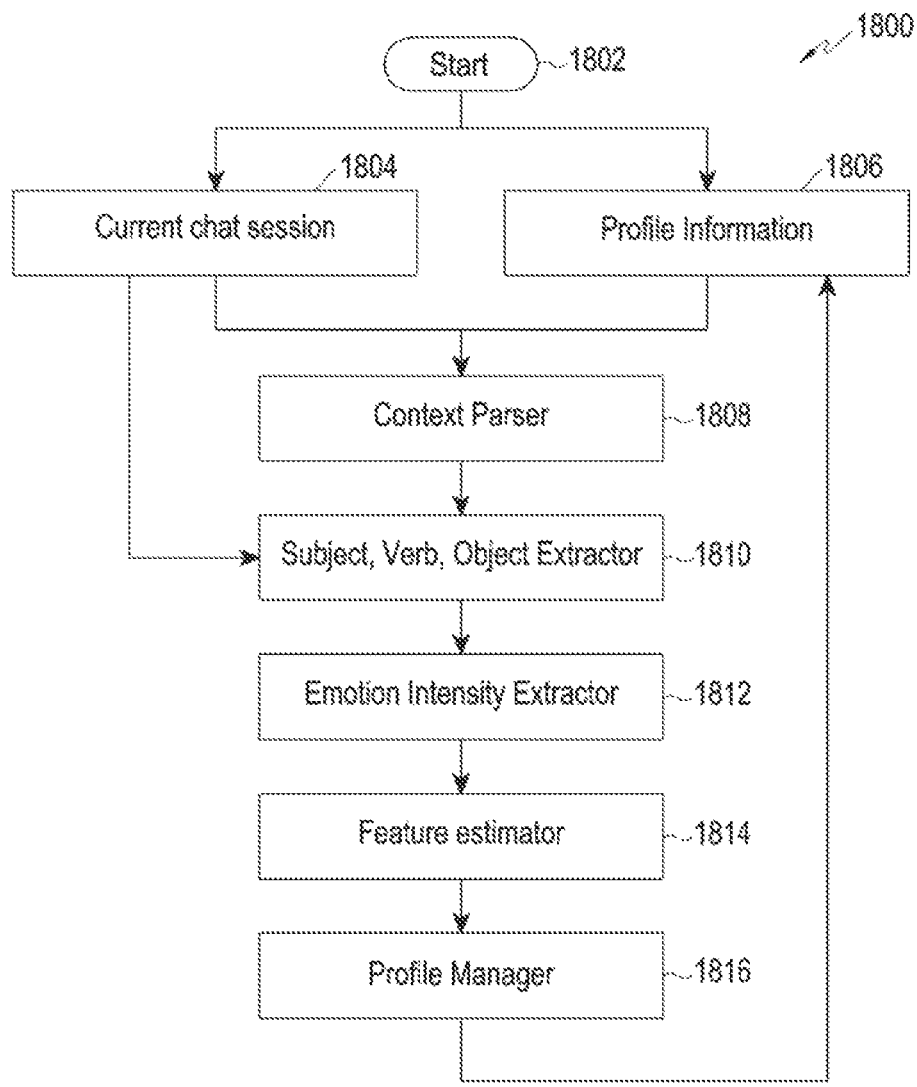
FIG. 18 illustrates a flow diagram depicting steps for extracting attributes, according to an embodiment.

FIG. 18 illustrates a flow diagram (1800) depicting steps for extracting attributes, according to an embodiment.

The flow diagram (1800) starts at a step (1802). At a step (1808), a context parser (1808) is configured to receive an ongoing conversation and analyse a current chat session (1804) and profile information of users (1806). The context parser (1808) is further configured to parse the context and emotions associated with the conversation by using the current chat session (1804) and the profile information of users (1806). At a step (1810), a subject, verb, object (SVO) extractor is configured to extract various information from the conversation, such as subject, action being performed, accessories related to the action or context, etc. At a step (1812), an emotion intensity extractor is configured to extract the intensity of an emotion by using user behavior and context of the conversation. At a step (1814), a feature estimator is configured to map the attributes of an object (i.e., subject/accessory) with a color, shape, accessories, objects on the basis of temperature, emotion, or any property mentioned in the conversation. At a step (1816), a profile manager is configured to find the chat style of the conversation, for example, formal, informal, friendly, intimate, etc., from a pre-defined learning model as well as user inputs.

Figure 19:
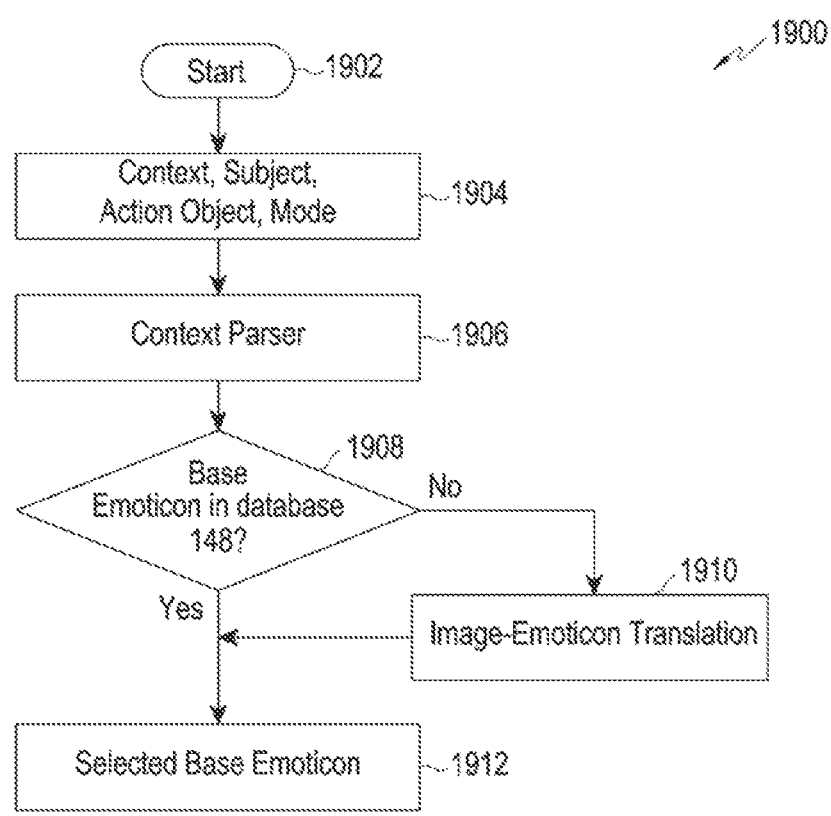
FIG. 19 illustrates a flow diagram depicting steps for selecting an emoticon, according to an embodiment.

FIG. 19 illustrates a flow diagram (1900) depicting steps for selecting an emoticon, according to an embodiment.

The flow diagram (1900) starts at a step (1902). At a step (1904), context, subject, action object, and chat mode are received. In an embodiment, the NLP module (108) is configured to receive context, subject, action object, and chat mode. At a step (1906), relevant words label mapping is performed. In an embodiment, the NLP module (108) identifies the relevant words and objects related to the context, subject, action object, and chat mode. From a database (148), a generation module (128) checks the base emoticon, as shown at a step (1908). In an embodiment, the generation module (128) selects a list of base emoticons that represent and/or can be transformed to represent the text/audio in a most accurate way as per the user profile and the chat mode, as shown at a step (1912). If a specific emotion is not found in the database (148), the generation module (128) performs an image search based on the keyword for which the emoticon was not found and passes that image to an image-emoticon translation that converts image to an emoticon, as shown at a step (1910).

Figure 20:
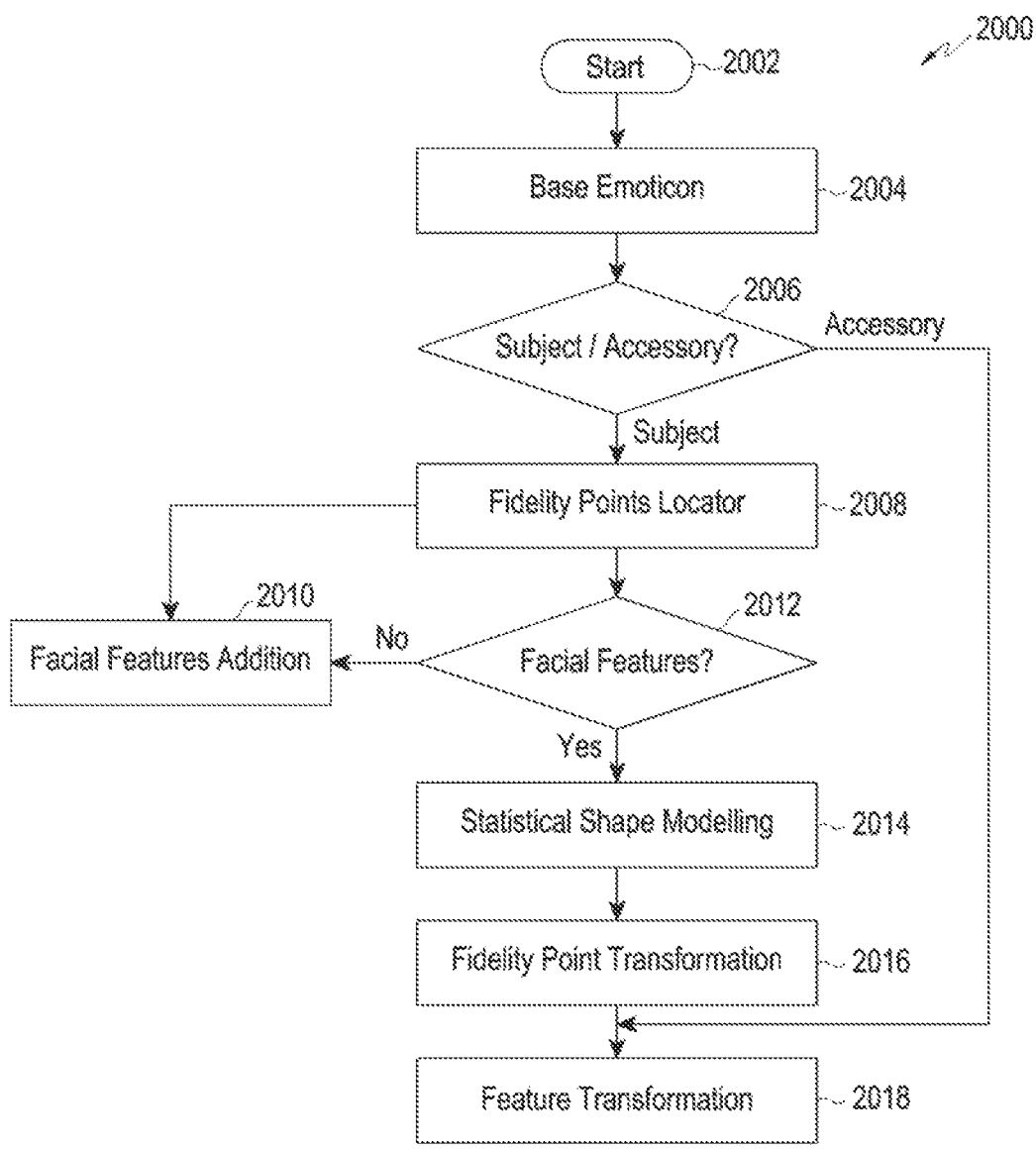
FIG. 20 illustrates a flow diagram depicting steps for transforming a base emoticon, according to an embodiment.

FIG. 20 illustrates a flow diagram (2000) depicting steps for transforming a base emoticon, according to an embodiment.

The flow chart (2000) starts at a step (2002). At a step (2004), a base emoticon (2004) is received as an input. At a step (2006), a transformation module (132) checks the subject/accessory in the base emoticon (2004). If a subject is found, a fidelity point locator is configured to determine the fiducial points in the base emoticon (2004) provided as the input, as shown at a step (2008). At a step (2012), the transformation module (132) checks the facial features. If there are no facial features found, the transformation module (132) can add facial features themselves, as shown at a step (2010). In an embodiment, the transformation module (132) can directly add facial features without checking whether the facial features are present or not. If the facial features are found, statistical shape modelling is performed, as shown at a step (2014). In an embodiment, the transformation module (132) makes a statistical shape using the obtained fiducial points, and identifies the facial features based on the shape. At a step (2016), fidelity point transformation is performed in which the shape passed to the GAN module (136) of the transformation module (132) to transform the base emoticon. The GAN module (136) takes feedback from a discriminator which is trained to find the emotion based on the shape of the facial features in the input. At a step (2018), feature transformation is performed in which the shape of the features in a normalized form, an input base emoticon, and an emotion are used as an input, and a machine learning based mapping model maps the motion vector of the shape corresponding to the specified emotion. In an embodiment, if an accessory is found at step (2006), then the transformation module (132) directly performs feature transformation at the step (2018). In one embodiment, finding the relative position of accessories with respect to the base emoticon and scaling on the basis of context depicted by them is performed.

Figure 21:
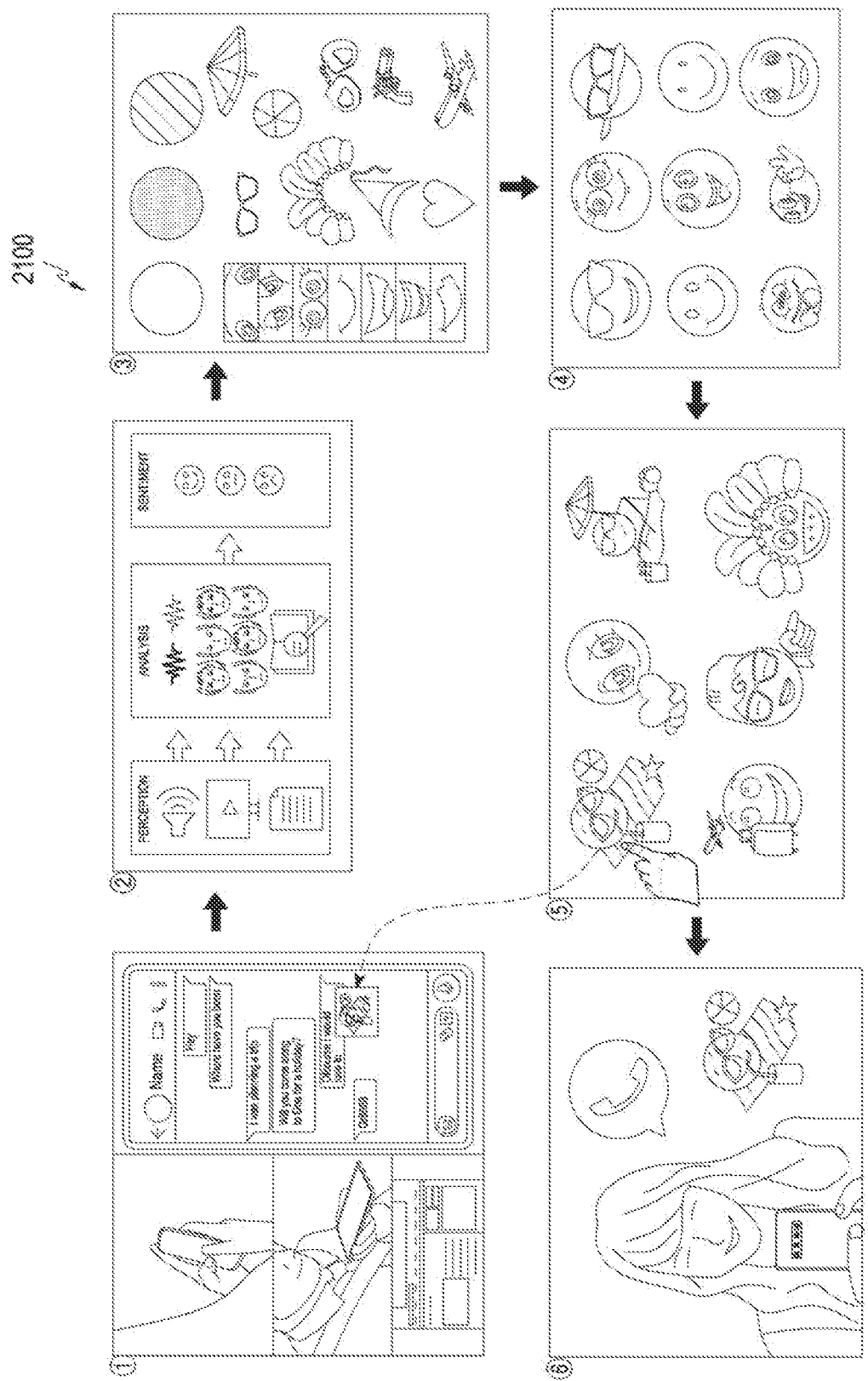
FIG. 21 illustrates a use-case scenario depicting generation and transformation of a base emoticon, according to an embodiment.

FIG. 21 illustrates a use-case scenario (2100) depicting generation and transformation of a base emoticon, according to an embodiment.

In FIG. 21, at a block (1), a system (100) receives text or voice inputs on various platforms from one or more users. At a block (2), contextual analysis is performed to infer emotion, mood, intensity, and action. At a block (3), an emoticon template is created for various features and external objects. At a block (4), a base emoticon is generated by extracting fiducial facial features. At a block (5), features are integrated using a geometric aware GAN module. At a block (6), a transformed emoticon is presented to a user at runtime with respect to attributes.

Figure 22:
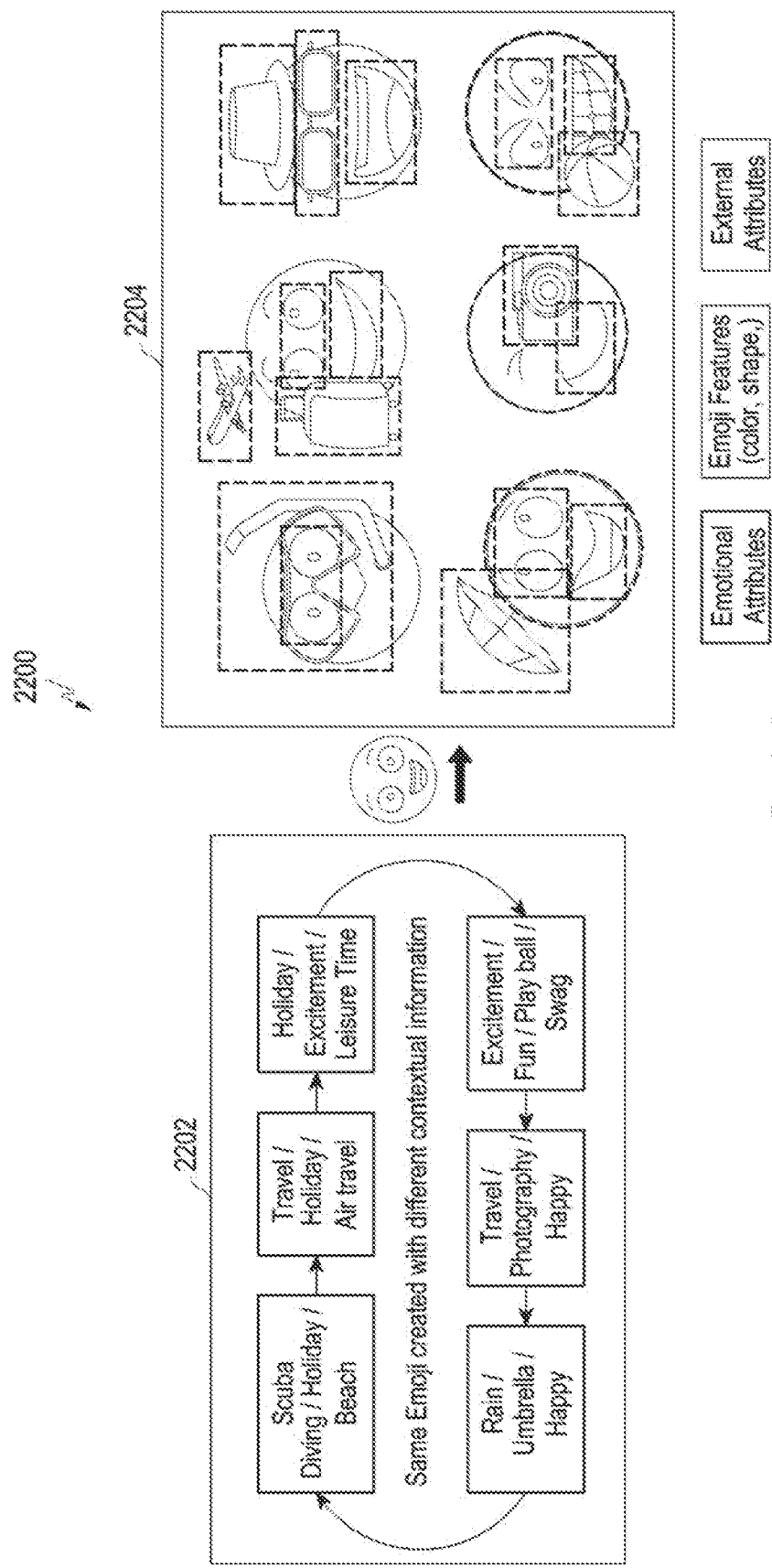
FIG. 22 illustrates a use-case scenario depicting generation of an emoticon with different contextual information, according to an embodiment.

FIG. 22 illustrates a use-case scenario (2200) depicting generation of an emoticon with different contextual information, according to an embodiment.

In an embodiment, the system (100) is configured to generate and transform an emoticon in real-time, by using a GAN, based on attributes such as emotion, action, and context of the associated text or audio. The transformation can be extended as per context to update other features such as color, shape, objects, accessories, as well as personalization based on the relationship between sender and receiver using a reinforcement model to generate a class of emoticons that represent the relationship between the users.

In FIG. 22, a same emoticon is created with different contextual information, such as Scuba Diving/Holiday/Beach, Travel/Holiday/Air travel, Holiday/Excitement/Leisure Time, Excitement/Fun/Playball/Swag, Travel/Photography/Happy, Rain/Umbrella/Happy, etc., as shown at a block (2202). At a block (2204), emotional attributes, emoticon features (color, shape, etc.), and external attributes are extracted.

Figure 23:
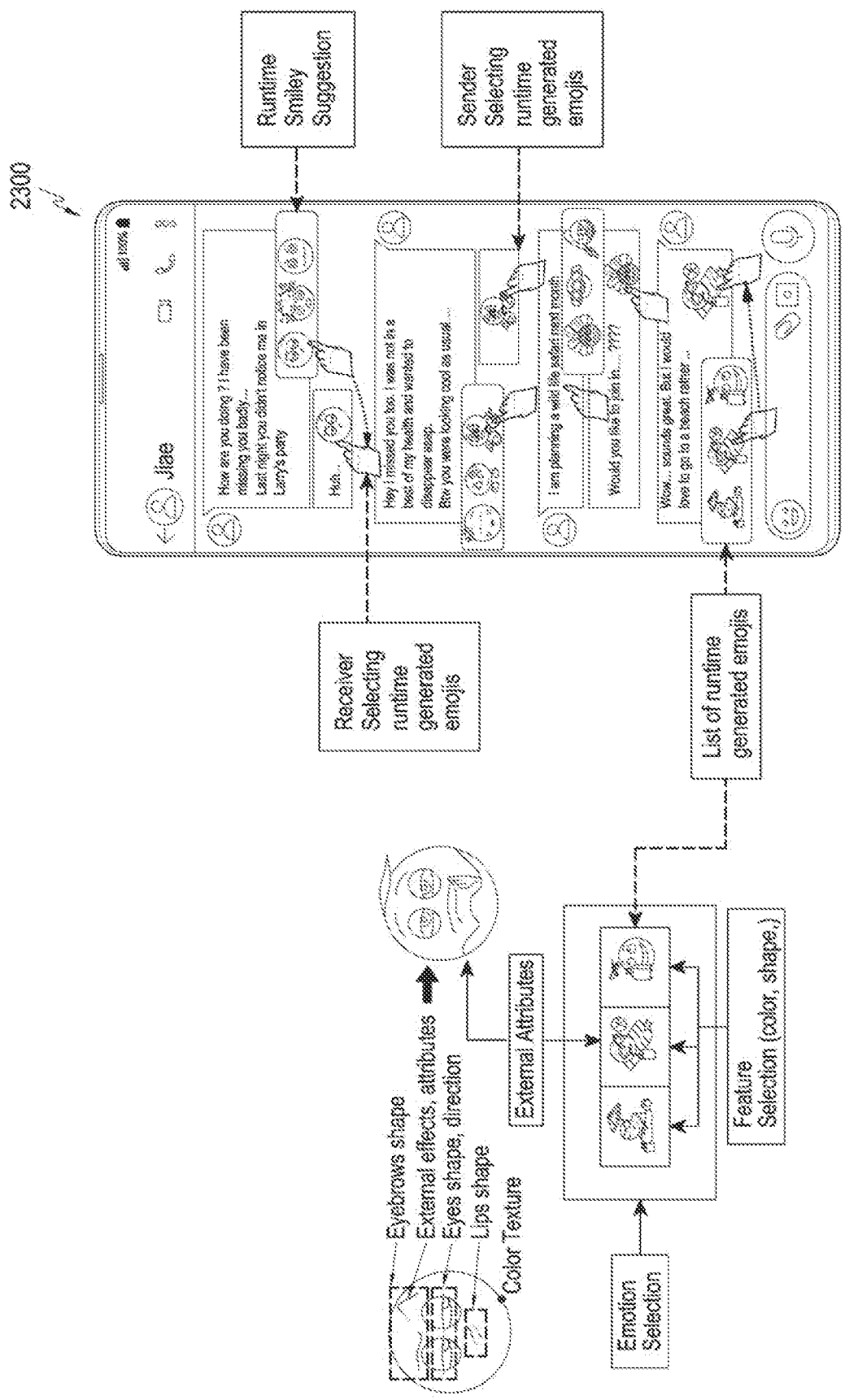
FIG. 23 illustrates a use-case scenario depicting generation of a base emoticon during conversation in runtime, according to an embodiment.

FIG. 23 illustrates a use-case scenario (2300) depicting generation of a base emoticon during conversation in runtime, according to an embodiment.

In FIG. 23, based on the current context of the conversation (as shown at a block, an emoticon is generated with a possible combination of inferred emotion context, feature selection logic and external attributes, if required, and suggested at the runtime. So, the user can easily select a relevant emoji from the available choices presented to the user. The choice of the user selection is be reflected for future emoticon generation-.

Figure 24A:
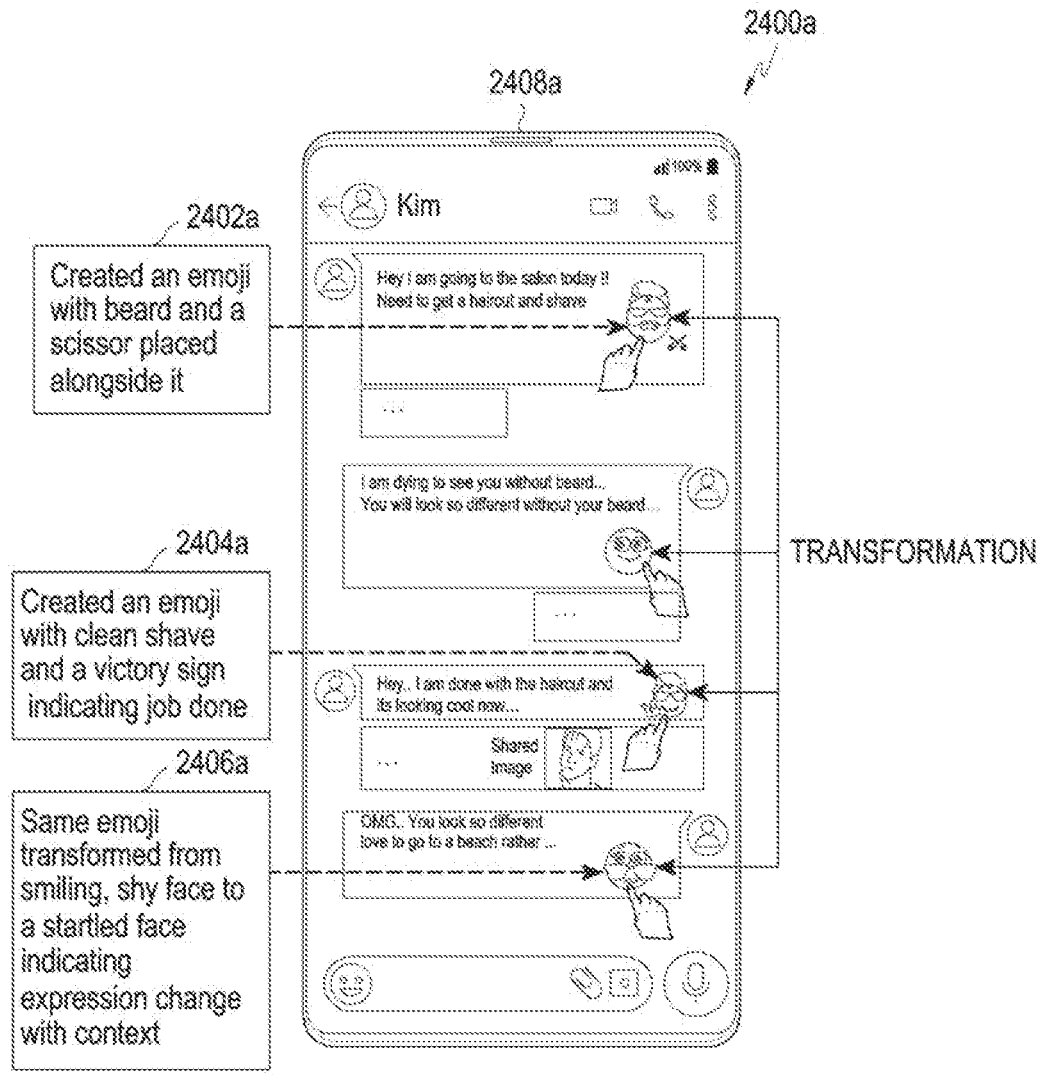
FIGS. 24A and 24B illustrate use-case scenarios depicting continuous transformation of a generated base emoticon based on context, according to an embodiment.
Figure 24B:
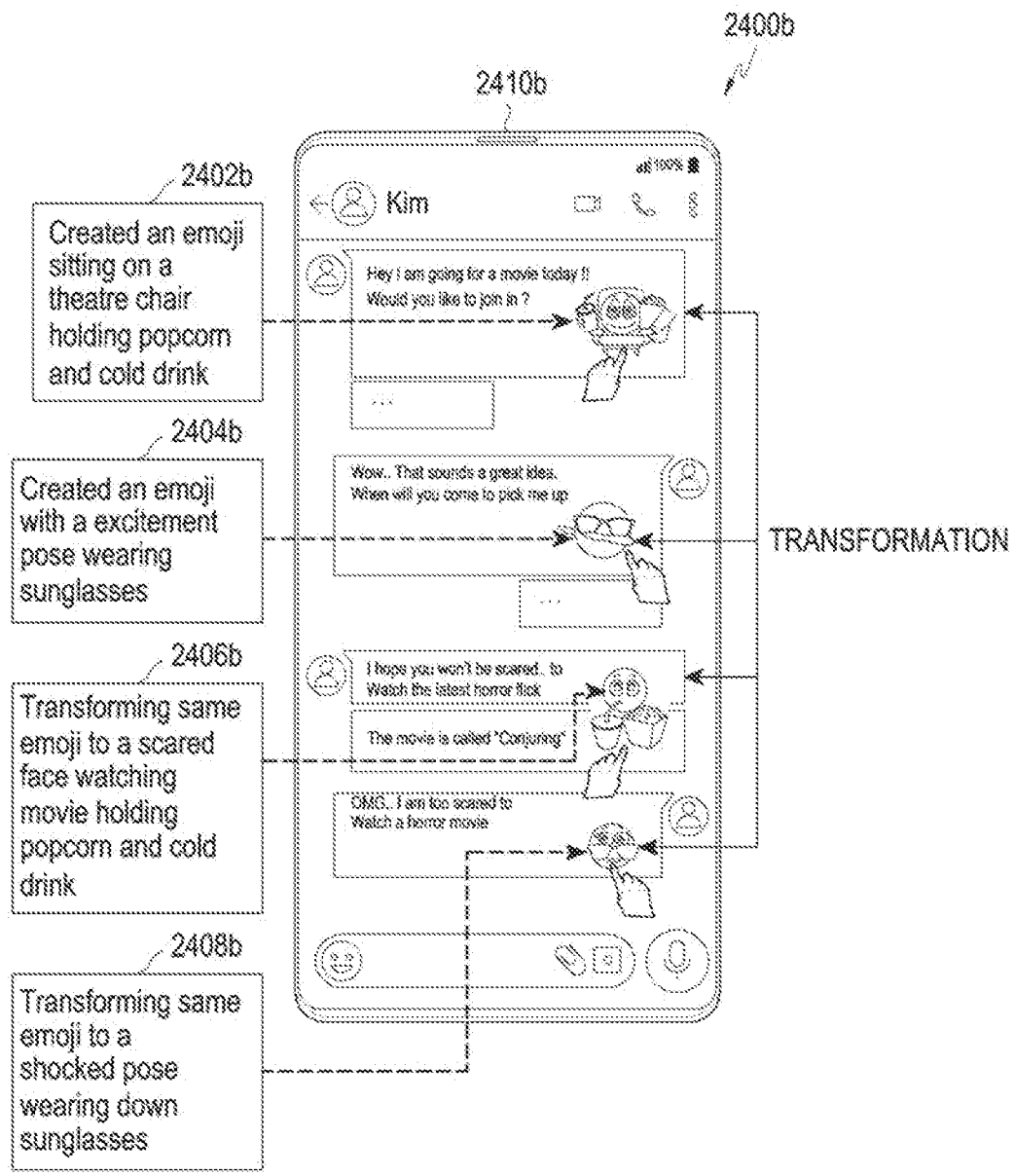

FIGS. 24a and 24b illustrate use-case scenarios (2400a, 2400b) depicting continuous transformation of a generated base emoticon based on context, according to an embodiment.

In FIG. 24a, based on the current context of the conversation, an emoticon is created and transformed at runtime. At a block (2402a), a first emoticon appears with a beard and scissors based on context of a receiver. The sender and receiver are talking about the receiver going to a salon to shave his long beard, as shown at a block (2408a). Then a smiling, shy face emoticon appears from the sender. Once confirmed about the haircut, the sender sends a haircut face of the same old emoticon face now since the beard is removed and a victory sign indicates that job is done, as shown at a block (2404a, 2406a). The sender gives a surprised look on the clean shaved image shared by user.

In FIG. 24b, based on the current context of the conversation, an emoticon is generated and transformed at runtime. The first emoticon appears sitting on a theatre chair, based on the context of a receiver, along with holding popcorn and cold drinks to share excitement, as shown at a block (2402b) on a block (2410b). A sender in return sends another emoticon, indicating excitement level, posing wearing sunglasses, as shown at a block (2404b). Based on informing the receiver of the horror genre of the booked movie, the sender checks if the receiver will be scared or not, as shown at a block (2406b), such as transforming the same emoticon to a scared face watching a movie holding popcorn and a cold drink. The sender gives a scared look as it was not expected by the sender. The sunglasses come down on the face and shocking eyes are shown at a block (2408b).

Figure 25:
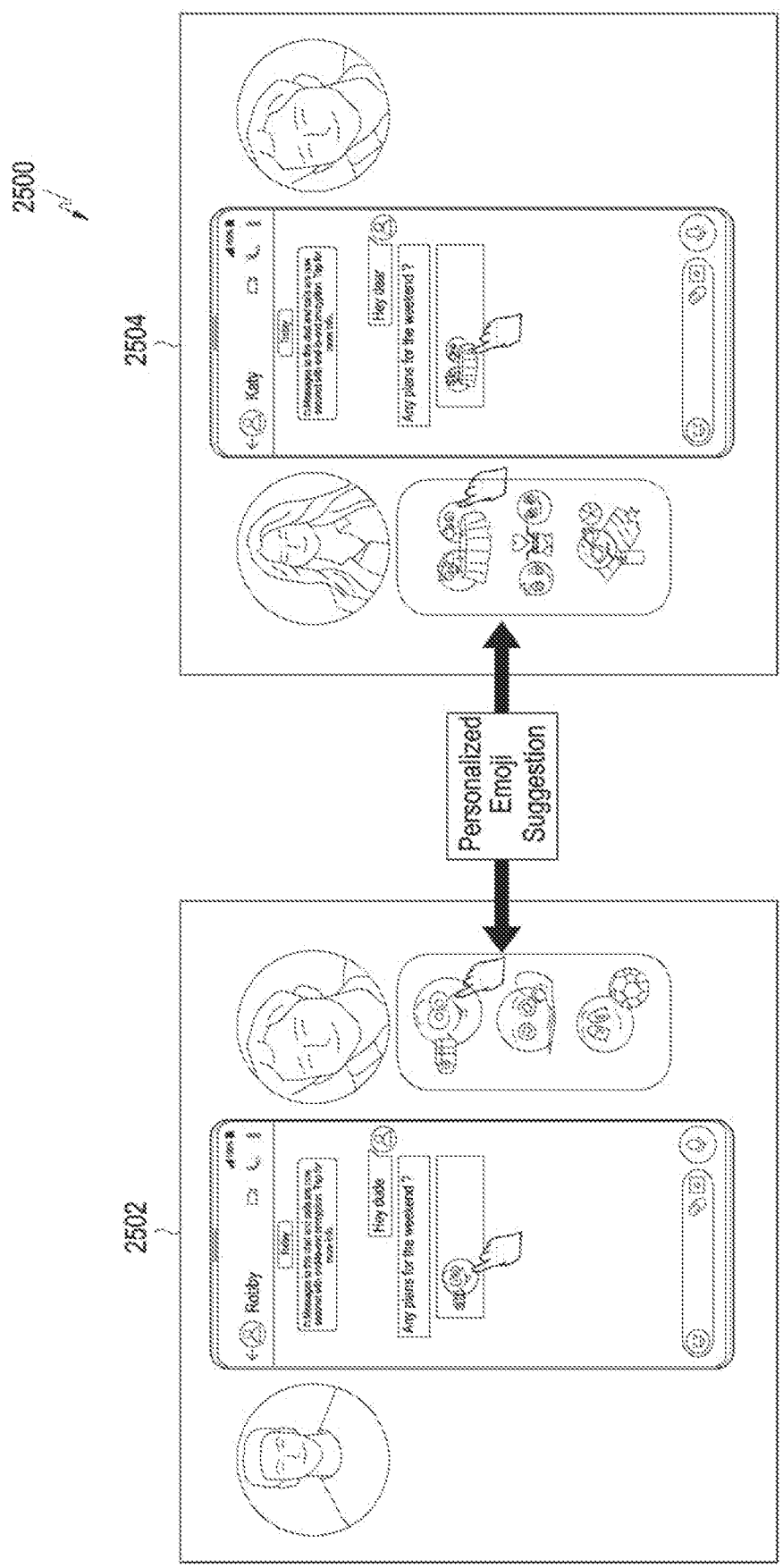
FIG. 25 illustrates a use-case scenario depicting generation of personalized emoticon, according to an embodiment.

FIG. 25 illustrates a use-case scenario (2500) depicting generation of personalized emoticon, according to an embodiment.

In FIG. 25, based on the current context of the conversation, a personalized emoticon is generated at runtime. The system (100) understands the person and context of conversation and for the same underlying text, for example "Plans for the weekend," generates different emoticons such as party, surfing, and a football match for a male friend Robby (as shown at a block (2502)), whereas the same text generates romantic dinner, date, holiday for girlfriend Katy (as shown at a block (2504).

Figure 26:
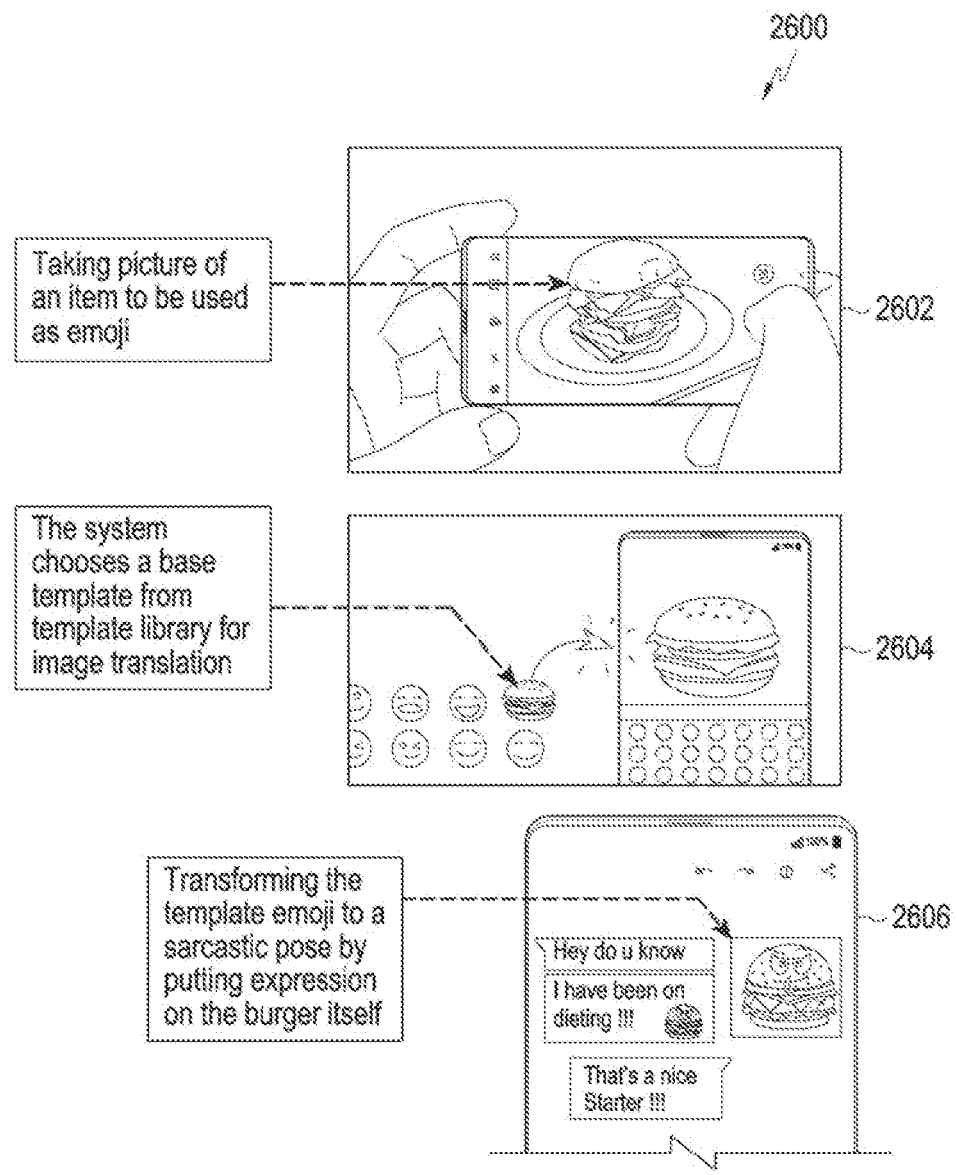
FIG. 26 illustrates a use-case scenario depicting image transformation to represent complex emotion, according to an embodiment.

FIG. 26 illustrates a use-case scenario (2600) depicting image transformation to represent complex emotion, according to an embodiment.

In FIG. 26, an image captured from a camera is to be used as an emoticon, as shown at a block (2602). First, a pre-existing template for the captured image is extracted. Based on a learning model, the same emoticon template is transformed with contextually relevant emotion and expression, as shown at a block (2604). The final emoticon is generated at runtime with complex emotion of sarcasm as depicted in the emoticon. The sender shares the burger emoticon while having a conversation about her diet plan conveying sarcasm to have started off with a burger, as shown at a block (2602). The generated image is saved for direct future usage.

Figure 27:
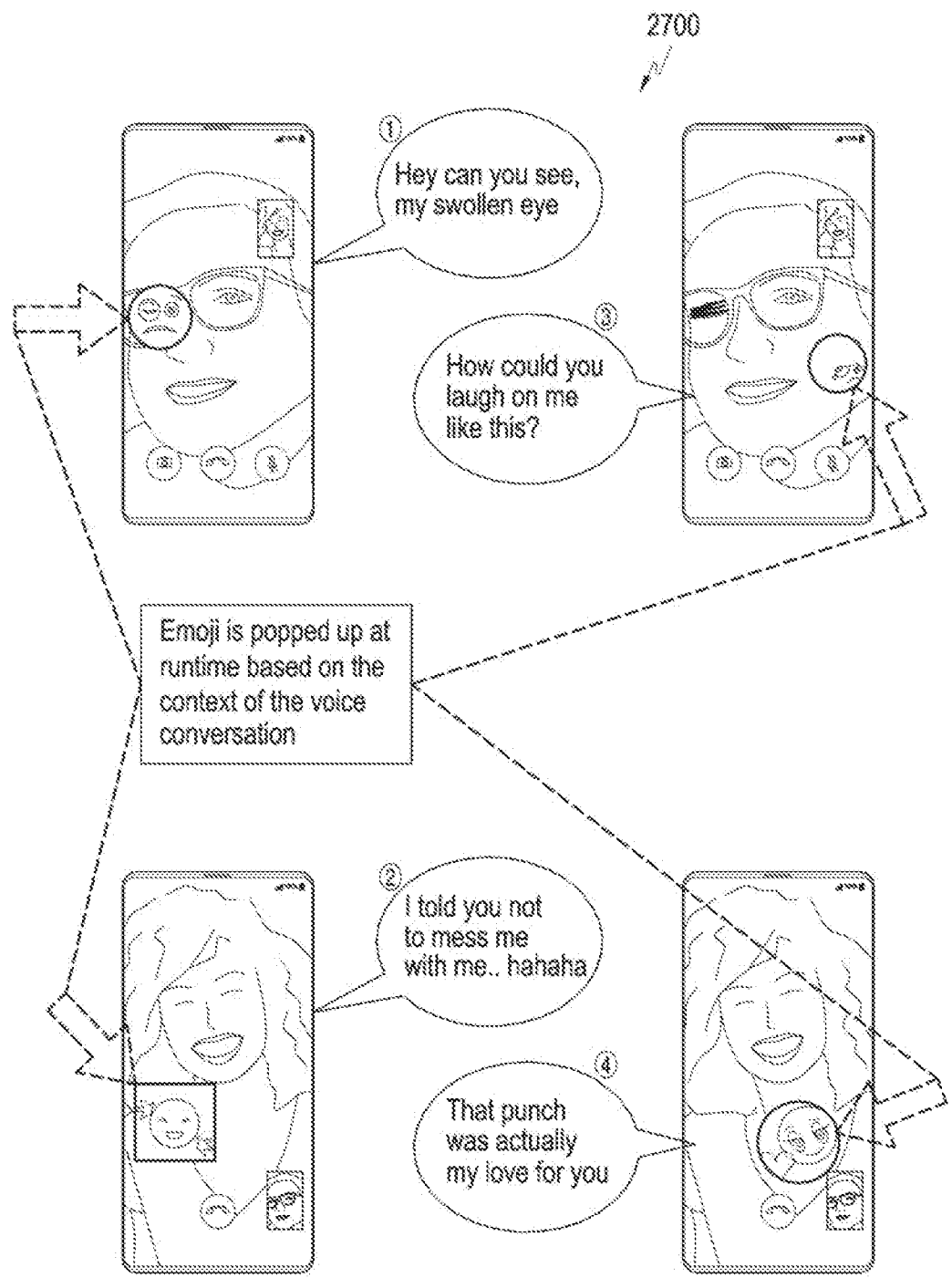
FIG. 27 illustrates a use-case scenario depicting emoticon generation and transformation during voice conversation, according to an embodiment.

FIG. 27 illustrates a use-case scenario (2700) depicting emoticon generation and transformation during voice conversation, according to an embodiment.

In FIG. 27, based on the current context of the conversation, an emoticon is generated and transformed at runtime. The first emoticon appears with a swollen eye based on context of a receiver telling the sender about his swollen eye, as shown at a block (1). A sender in return laughs due to the situation corresponding to which another emoticon indicating a laugh riot based on a laughing intensity level, as shown at a block (2). The receiver pleads to the sender that he does not like the sender laughing at this situation, as shown at a block (3). The sender gives a heart out on a palm to please the receiver so as to make him feel nice, as shown at block (4).

Figure 28:
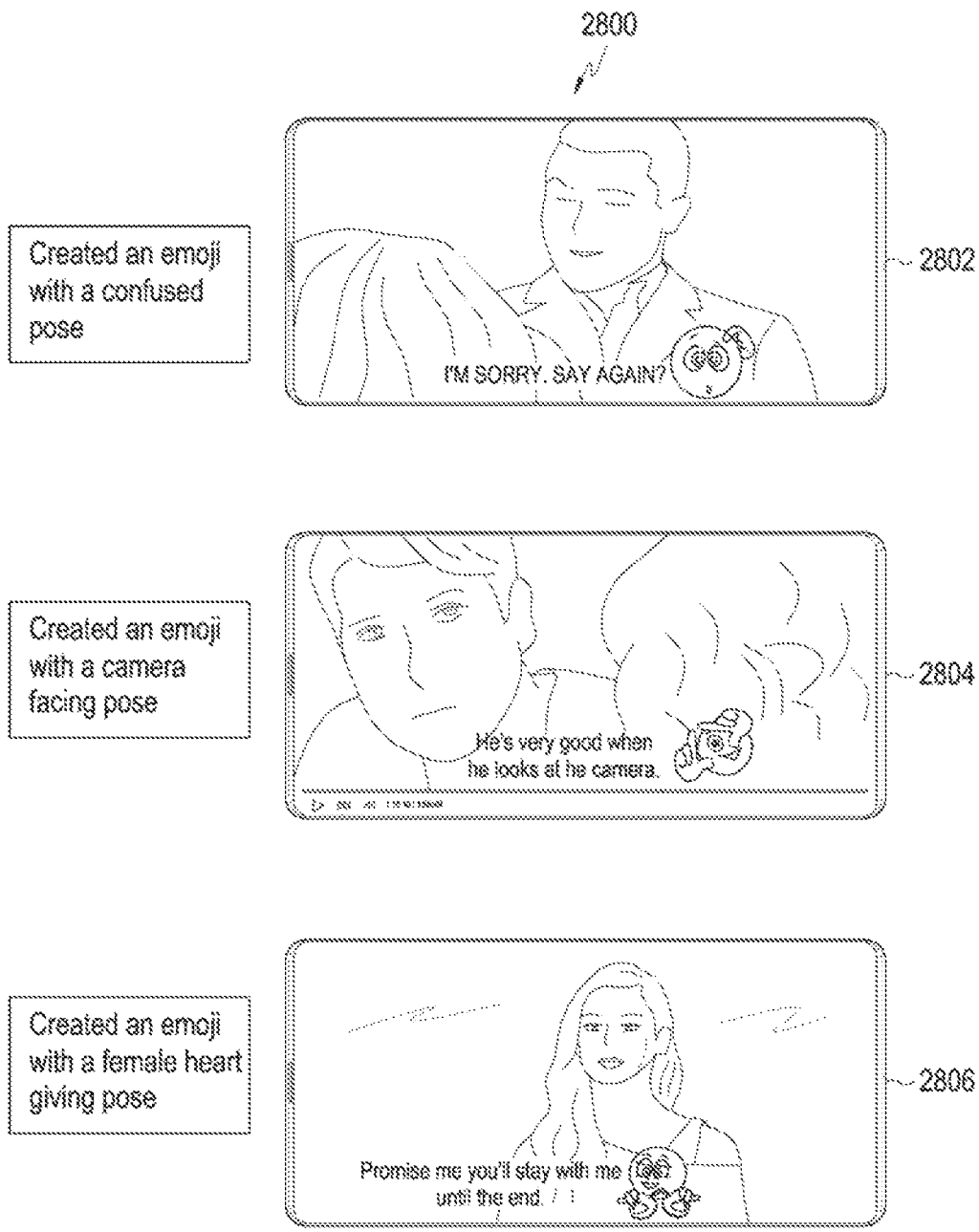
FIG. 28 illustrates a use-case scenario depicting emoticon usage in subtitles in video content, according to an embodiment.

FIG. 28 illustrates a use-case scenario (2800) depicting emoticon usage in subtitles in video content, according to an embodiment.

In FIG. 28, based on the current context of the conversation, an emoticon is generated and transformed at runtime. The first emoticon appears confused based on context of an actor asking to repeat the sentence again, as shown at a block (2802). In another dialogue, the emoticon acts as camera facing pose based on the dialogue of an actor, as shown at a block (2804). In another scene, an actress delivering a romantic dialogue is accordingly conveyed through a runtime generated emoticon with a heart, as shown at a block (2806).

Figure 29:
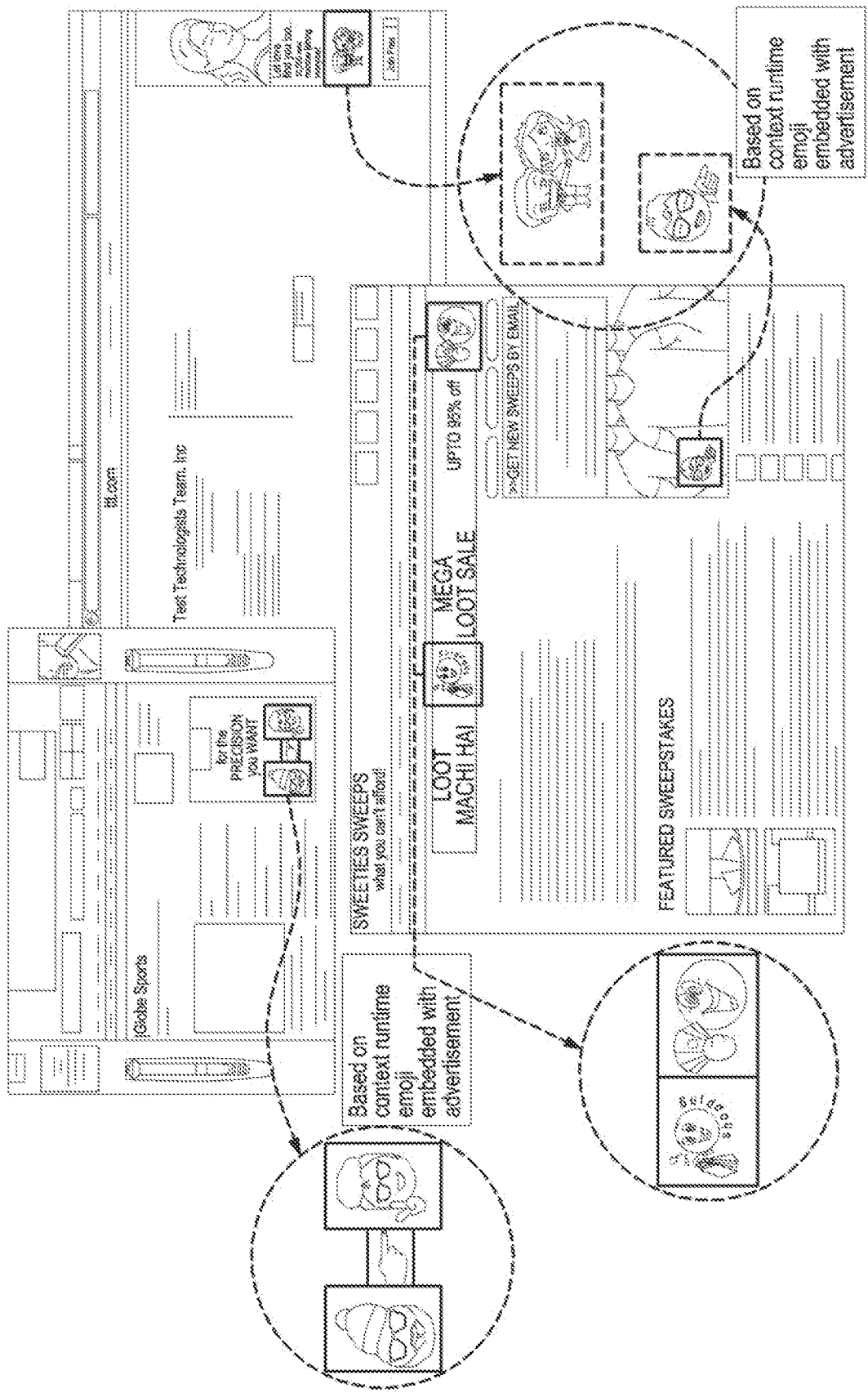
FIG. 29 illustrates a use-case scenario depicting generating runtime embedded emoticon for advertisements, according to an embodiment.

FIG. 29 illustrates a use-case scenario (2900) depicting generating a runtime embedded emoticon for advertisements, according to an embodiment.

In FIG. 29, based on the current context of the advertisement, an emoticon is generated and transformed at runtime. The runtime generated emoticon are embedded along with the advertisement at appropriate location. The Philips razor add shows a bearded emoticon turning to a clean shaven man. The Mega sale offer is supported with a shopping emoticon and one money saver emoticon. The Shadi.com website shows a wedding couple as an emoticon for more effects. The embedded emoticon could act as great supporting actors for better impact of an advertisement.

The technical advantages of using the system (100) may include —the ability to support various and diversified sets of emoticons to express all kinds of sentiments based on emoticon generation at runtime; the ability to depict complex emotions such as satire and sarcasm; the ability to generate different types of emoticons for different categories of chat, e.g. formal, informal, friendly, casual, etc., increases emoji usage and gives proper representation to the expression being conveyed; —the ability to provide dynamic emoticon generation compliments the growth in different areas in addition to chats, such as marketing because of ease of generation of content specific emoticons; and the ability to provide real time emoticon generation can increase the use of emoticons in subtitles, hence conveying the emotions behind the statements properly.

It should be noted that the description merely illustrates the principles of the present disclosure. It will thus be appreciated that those skilled in the art will be able to devise various arrangements that, although not explicitly described herein, embody the principles of the present disclosure. Furthermore, all examples recited herein are principally intended expressly to be only for explanatory purposes to help the reader in understanding the principles of the disclosure and the concepts contributed by the inventor(s) to furthering the art and are to be construed as being without limitation to such specifically recited examples and conditions. Moreover, all statements herein reciting principles, aspects, and embodiments of the disclosure, as well as specific examples thereof, are intended to encompass equivalents thereof

What is claimed is:

1. A method for generating a real-time context-based emoticon, the method comprising:
    receiving conversation information associated with a conversation between a set of users;
    identifying an attribute associated with the conversation, based on the conversation information;
    generating a base emoticon;
    generating an output shape based on a fiducial point of the base emoticon;
    transforming the output shape of the base emoticon with an accessory, based on the attribute associated with the conversation; and
    generating the real-time context-based emoticon for the conversation, based on transforming the output shape of the base emoticon with the accessory.

2. The method of claim 1, wherein the conversation information includes text, audio, or video,
    wherein the attribute includes at least one of a context, an emotion, or an action associated with the conversation.

3. The method of claim 1, further comprising:
    determining a context associated with the conversation based one the conversation information,
    classifying an emotion associated with the conversation into at least one emotional state based on the conversation information, and
    detecting an action associated with the conversation based on the conversation information.

4. The method of claim 1, further comprising:
    parsing the conversation information to identify the attribute associated with the conversation, and
    identifying a position of the accessory in relation to the base emoticon,
    wherein identifying the position comprises identifying the position based on the base emoticon and the attribute using a machine learning technique.

5. The method of claim 1, further comprising:
    selecting the base emoticon and the accessory based on the attribute associated with the conversation,
    wherein the output shape of the base emoticon is transformed and positioned with the accessory to generate the real-time context-based emoticon.

6. The method of claim 1, further comprising:
    transforming one or more convoluted features of at least one pre-determined emoticon stored in a database by morphing a pre-learnt transformation of a geometric shape of the one or more convoluted features based on one or more attributes.

7. The method of claim 1, further comprising:
    managing profiles of each user of set of users associated with the conversation by determining a conversation style and a relationship between the set of users;
    extracting information related to a subject, an action being performed during the conversation, and one or more accessories related to the attribute;
    predicting the intensity of the attribute based on user behavior, the profiles, and a context associated with the conversation; and
    identifying at least one relevant keyword associated with the context from the conversation; and
    identifying a set of pre-determined emoticons associated with the identified keyword from a database,
    wherein generating the base emoticon comprises generating the base emoticon based on at least one of the subject, the action, the one or more accessories, the user profiles, words, and objects.

8. The method of claim 1, further comprising:
    identifying an image content of the base emoticon representing an emotion or the accessory based on the attribute associated with the conversation;
    converting the image content to the base emoticon using a machine learning translation model,
    determining an emotion represented by the output shape of the base emoticon; and
    generating a set of motion vectors based on the determined emotion, the attribute associated with the conversation, and the generated output shape;
    normalizing at least one motion vector from the set of motion vectors and the generated output shape of the base emoticon;

transforming the normalized motion vector and the generated output shape of the base emoticon; and
generating the real-time context-based emoticon for the conversation,
wherein the output shape of the base emoticon is generated using a neural network, and
wherein generating the real-time context-based emoticon comprises generating the real-time context-based emoticon for the conversation in real-time.

9. The method of claim 7, further comprising:
updating one or more features of the base emoticon and personalizing the one or more features based on the determined relationship between the set of users using a reinforcement model; and
generating a class of one or more emoticons to represent the determined relationship.

10. A real-time context-based emoticon generation system, the system comprising:
a memory configured to store instructions; and
a processor configured to execute the instructions to:
receive conversation information associated with a conversation between a set of users;
identify an attribute associated with the conversation, based on the conversation information;
generate a base emoticon;
generate an output shape of the base emoticon based on a fiducial point of the base emoticon;
transform the output shape of the base emoticon with an accessory, based on the attribute associated with the conversation; and
generate the real-time context-based emoticon for the conversation, based on transforming the output shape of the base emoticon with the accessory.

11. The system of claim 10, wherein the processor is further configured to:
parse the conversation information to identify the attribute associated with the conversation, and
identify a position of the accessory in relation to the base emoticon.

12. The system of claim 10, wherein the attribute includes at least one of a context, an emotion, and an action associated with the conversation.

13. The system of claim 10, wherein the processor is further configured to:
determine a context associated with the conversation based on the conversation information,
classify an emotion associated with the conversation into at least one emotional state based on the conversation information, and
detect an action associated with the conversation based on the conversation information, wherein the processor is further configured to:
select at least one pre-determined emoticon from among a plurality of pre-determined emoticons stored in the memory based on the attribute,
select at least one accessory from among a plurality of accessories stored in the memory based on the attribute, and
generate the real-time context-based emoticon for the conversation in real-time.

14. The system of claim 10, wherein the processor is further configured to:
transform one or more convoluted features of at least one pre-determined emoticon stored in a database by morphing a pre-learnt transformation of a geometric shape of the one or more convoluted features based on the attributes.

15. The system of claim 10, wherein the processor is further configured to:
manage profiles of each user of set of users associated with the conversation by determining a conversation style and a relationship between the set of users;
extract information related to subject, an action being performed during the conversation, and one or more accessories related to the attribute;
predict the intensity of the attribute based on user behavior, the profiles, and a context associated with the conversation;
identify at least one relevant keyword associated with the context from the conversation; and
identify a set of pre-determined emoticons associated with the identified keyword from a database.

16. The system of claim 10, wherein the processor is further configured to:
identify an image content of the base emoticon representing an emotion or the accessory based on the attribute associated with the conversation; and
convert the image content to the base emoticon using a machine learning translation model.

17. The system of claim 15, wherein the processor is further configured to:
determine an emotion represented by the output shape of the base emoticon;
generate a set of motion vectors based on the determined emotion, the attribute associated with the conversation, and the generated output shape;
normalize at least one motion vector from the set of motion vectors and the generated output shape of the base emoticon;
transform the normalized motion vector and the generated output shape of the base emoticon; and
generating the real-time context-based emoticon for the conversation, wherein the processor is configured to generate the output shape of the base emoticon using a neural network.

18. The system of claim 15, wherein the processor is further configured to:
update one or more features of the base emoticon and personalize the base emoticon based on the determined relationship between the set of users using a reinforcement model; and
generate a class of one or more emoticons to represent the determined relationship.

19. A method for generating a real-time context-based emoticon, the method comprising:
receiving conversation information associated with a conversation between a set of users;
extracting an attribute from the conversation, based on the conversation information;
identifying a subject, an action being performed during the conversation, and an accessory associated with the attribute associated with the conversation;
predicting the intensity of the attribute based on user behavior and a context associated with the conversation;
identifying a relevant keyword associated with the context from the conversation;
selecting an emoticon from a plurality of pre-determined emoticons which is correlated with the attribute for the keyword;
identifying an image content based on the attribute associated with the conversation;
converting the image content to a base emoticon using a machine learning translation model during runtime;

generating an output shape based on one or more fiducial points of the base emoticon;

determining one or more facial features represented by the output shape of the base emoticon;

generating a set of motion vectors based on the one or more facial features, the identified attribute associated with the conversation and the generated output shape;

normalizing at least one motion vector and the generated output shape of the base emoticon;

transforming the normalized motion vector and the generated output shape of the base emoticon; and generating the real-time context-based emoticon for the conversation.

20. A real-time context-based emoji generation system, the system comprising:

a memory configured to store instructions; and a processor configured to execute the instructions to:

receive conversation information associated with a conversation between a set of users;

extract an attribute from the conversation;

predict the intensity of the attribute based on user behavior and a context associated with the conversation;

identify a relevant keyword associated with the context from the conversation;

select an emoticon from a plurality of pre-determined emoticons which is correlated with the attribute;

generate a base emoticon using the selected emoticon;

generate an output shape based on one or more fiducial points of the base emoticon;

determine an emotion represented by the output shape of the base emoticon;

generate a set of motion vectors based on the determined emoticon, wherein the attribute is associated with the conversation, and the generated output shape;

normalize at least one motion vector from the set of motion vectors and the generated output shape of the base emoticon;

transform the normalized motion vector and the generated output shape of the base emoticon; and generate a transformed emoticon for said conversation.

* * * * *